US010863060B2

(12) United States Patent
Kokonaski et al.

(10) Patent No.: US 10,863,060 B2
(45) Date of Patent: Dec. 8, 2020

(54) SMART CASE FOR ELECTRONIC WEARABLE DEVICE

(71) Applicant: POGOTEC, INC., Roanoke, VA (US)

(72) Inventors: William Kokonaski, Belfair, WA (US); Amitava Gupta, Roanoke, VA (US); Joshua A. Schoenbart, Roanoke, VA (US); Ronald D. Blum, Roanoke, VA (US); Stefan Bauer, Bern (CH); Jean-Noel Fehr, Neuchâtel (CH); Richard Clompus, Trinidad, CA (US)

(73) Assignee: POGOTEC, INC., Roanoke, VA (US)

( * ) Notice: Subject to any disclaimer, the term of this patent is extended or adjusted under 35 U.S.C. 154(b) by 0 days.

(21) Appl. No.: 15/807,308

(22) Filed: Nov. 8, 2017

(65) Prior Publication Data

US 2018/0131847 A1    May 10, 2018

Related U.S. Application Data

(60) Provisional application No. 62/418,872, filed on Nov. 8, 2016, provisional application No. 62/447,404, filed
(Continued)

(51) Int. Cl.
*H04N 5/225* (2006.01)
*H04N 5/232* (2006.01)
(Continued)

(52) U.S. Cl.
CPC ......... *H04N 5/2252* (2013.01); *H02J 7/0044* (2013.01); *H02J 7/025* (2013.01);
(Continued)

(58) Field of Classification Search
None
See application file for complete search history.

(56) References Cited

U.S. PATENT DOCUMENTS 3,476,467 A    11/1969 Curry
3,593,449 A    7/1971 Nielson
(Continued)

FOREIGN PATENT DOCUMENTS

CA        154079 S       12/2014
CN        201318005       9/2009
(Continued)

OTHER PUBLICATIONS

U.S. Appl. No. 15/809,383 entitled "Wearable Camera Systems and Apparatus and Method for Attaching Camera Systems or Other Electronic Devices to Wearable Articles" filed Nov. 10, 2017, pp. all.
(Continued)

*Primary Examiner* — Cynthia Segura
(74) *Attorney, Agent, or Firm* — Knobbe, Martens, Olson & Bear, LLP

(57) ABSTRACT

Auxiliary units, in some instances implemented as a case for a wearable electronic device such as a wearable camera are described. The auxiliary units may include one or more electronic components typically included in the camera. By offloading an electronic component and the corresponding function (e.g., extended power capacity, memory capacity, wireless or other communication capabilities, etc.) to a removable auxiliary unit, the size of the wearable device can be advantageously further reduced.

46 Claims, 22 Drawing Sheets

Related U.S. Application Data on Jan. 17, 2017, provisional application No. 62/461,579, filed on Feb. 21, 2017, provisional application No. 62/461,977, filed on Feb. 22, 2017, provisional application No. 62/464,075, filed on Feb. 27, 2017, provisional application No. 62/515,860, filed on Jun. 6, 2017.

(51) Int. Cl.
  *H02J 7/02* (2016.01)
  *H02J 7/00* (2006.01)
  *H02J 7/34* (2006.01)

(52) U.S. Cl.
  CPC ......... *H02J 7/342* (2020.01); *H04N 5/23206* (2013.01); *H04N 5/23241* (2013.01); *H04N 5/23293* (2013.01); *H02J 7/00* (2013.01)

(56) References Cited

U.S. PATENT DOCUMENTS

| | | |
|---|---|---|
| 3,780,918 A | 12/1973 | Curtis |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,791,963 A | 12/1988 | Gronert et al. |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,913,815 A | 6/1999 | Ball et al. |
| 5,915,588 A | 6/1999 | Stoken et al. |
| 6,020,920 A | 2/2000 | Anderson |
| 6,028,413 A | 2/2000 | Brockmann |
| 6,076,927 A | 6/2000 | Owens |
| 6,091,546 A | 7/2000 | Spitzer |
| 6,120,146 A | 9/2000 | Harris |
| 6,157,291 A | 12/2000 | Kuenster et al. |
| 6,215,460 B1 | 4/2001 | Mizoguchi et al. |
| 6,275,681 B1 | 8/2001 | Vega et al. |
| 6,282,302 B1 | 8/2001 | Hara |
| 6,349,001 B1 * | 2/2002 | Spitzer ................. G02B 27/017 359/618 |
| 6,657,673 B2 | 12/2003 | Ishikawa et al. |
| 6,711,744 B1 | 3/2004 | Hockenbury |
| 6,735,897 B1 | 5/2004 | Schmitter |
| 6,783,238 B1 | 8/2004 | Stepper |
| 6,977,479 B2 | 12/2005 | Hsu |
| 7,003,353 B1 | 2/2006 | Parkhouse |
| 7,092,763 B1 | 8/2006 | Griffith et al. |
| 7,126,558 B1 | 10/2006 | Dempski |
| D531,656 S | 11/2006 | Della Valle |
| 7,158,096 B1 | 1/2007 | Spitzer |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,438,410 B1 * | 10/2008 | Howell ................. G02C 11/00 351/158 |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| 7,988,283 B2 | 8/2011 | Jannard |
| 8,046,948 B2 | 11/2011 | Mauch et al. |
| 8,068,169 B2 | 11/2011 | Chang |
| D650,411 S | 12/2011 | Fuchs |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| D712,452 S | 9/2014 | Fuchs |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,922,161 B2 | 12/2014 | Choi et al. |
| D720,800 S | 1/2015 | Shin |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,957,629 B2 | 2/2015 | Ryu et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |
| D737,889 S | 9/2015 | Yoo |
| 9,122,083 B2 | 9/2015 | Blum et al. |
| D741,943 S | 10/2015 | Keplinger |
| 9,152,130 B2 | 10/2015 | Pattikonda et al. |
| D742,372 S | 11/2015 | Christopher et al. |
| D743,477 S | 11/2015 | Strecker |

(56) References Cited

U.S. PATENT DOCUMENTS

| | | |
|---|---|---|
| D743,479 S | 11/2015 | Keplinger |
| D745,922 S | 12/2015 | Shen |
| D746,358 S | 12/2015 | Markovitz et al. |
| D755,787 S | 5/2016 | Zander et al. |
| 9,344,686 B2* | 5/2016 | Moharir ................ H04N 7/185 |
| 9,380,374 B2 | 6/2016 | Sprague et al. |
| D763,951 S | 8/2016 | Chae |
| D765,765 S | 9/2016 | Clegg |
| D766,770 S | 9/2016 | Devaney et al. |
| D767,013 S | 9/2016 | Hsu |
| D767,014 S | 9/2016 | Fuchs |
| D772,330 S | 11/2016 | Hsu |
| 9,524,530 B2* | 12/2016 | Moharir ................ G06Q 50/24 |
| 9,584,705 B2* | 2/2017 | Nordstrom ........... H04N 5/2252 |
| 9,628,707 B2* | 4/2017 | Blum ................. H04N 5/23206 |
| 9,635,222 B2 | 4/2017 | Blum et al. |
| D787,582 S | 5/2017 | Desodt et al. |
| 9,781,319 B2* | 10/2017 | Barros ................. H04N 5/2252 |
| 9,823,494 B2 | 11/2017 | Blum et al. |
| 9,853,672 B2* | 12/2017 | Ko ........................... G06F 3/011 |
| 9,930,257 B2* | 3/2018 | Blum ...................... H02J 50/10 |
| 10,038,830 B2* | 7/2018 | Barros .............. H04N 5/23241 |
| 10,509,466 B1* | 12/2019 | Miller ..................... G06K 9/52 |
| 2002/0170147 A1 | 11/2002 | Heller |
| 2004/0008157 A1* | 1/2004 | Brubaker ............ G02B 27/017 345/8 |
| 2004/0080299 A1 | 4/2004 | Forster et al. |
| 2004/0088051 A1 | 5/2004 | Seligman |
| 2004/0221370 A1 | 11/2004 | Hannula et al. |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0167558 A1 | 8/2005 | Smith |
| 2005/0248717 A1 | 11/2005 | Howell et al. |
| 2006/0004546 A1 | 1/2006 | Slanec |
| 2006/0023158 A1 | 2/2006 | Howell et al. |
| 2006/0034478 A1 | 2/2006 | Davenport |
| 2006/0055786 A1 | 3/2006 | Ollila |
| 2006/0082730 A1 | 4/2006 | Franks |
| 2006/0095128 A1 | 5/2006 | Blum et al. |
| 2006/0121639 A1 | 6/2006 | Tai et al. |
| 2006/0158514 A1 | 7/2006 | Moreb |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0153639 A1 | 7/2007 | Lafever et al. |
| 2008/0034637 A1 | 2/2008 | Summers |
| 2008/0088791 A1 | 4/2008 | Smith |
| 2008/0116847 A1 | 5/2008 | Loke et al. |
| 2008/0156670 A1 | 7/2008 | Law |
| 2008/0163536 A1 | 7/2008 | Koch et al. |
| 2008/0180537 A1 | 7/2008 | Weinberg et al. |
| 2008/0208335 A1 | 8/2008 | Blum et al. |
| 2008/0231721 A1 | 9/2008 | Chou et al. |
| 2008/0239232 A1 | 10/2008 | Guerrero |
| 2008/0259269 A1 | 10/2008 | Grogan et al. |
| 2008/0266448 A1* | 10/2008 | Reiner ................. H04N 5/2251 348/376 |
| 2008/0301846 A1 | 12/2008 | Brillouet |
| 2009/0009410 A1 | 1/2009 | Dolgin et al. |
| 2009/0040308 A1 | 2/2009 | Temovskiy |
| 2009/0110386 A1 | 4/2009 | Kamada et al. |
| 2009/0173760 A1 | 7/2009 | Good |
| 2009/0189981 A1 | 7/2009 | Siann et al. |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0264966 A1 | 10/2009 | Blum et al. |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0245757 A1 | 9/2010 | Sugihara et al. |
| 2010/0265655 A1 | 10/2010 | Metzler et al. |
| 2010/0284683 A1 | 11/2010 | Fressola et al. |
| 2010/0319096 A1 | 12/2010 | Scott et al. |
| 2011/0074349 A1 | 3/2011 | Ghovanloo |
| 2011/0115429 A1 | 5/2011 | Toivola et al. |
| 2011/0121042 A1 | 5/2011 | Weiss |
| 2011/0156639 A1 | 6/2011 | Ryu et al. |
| 2011/0184320 A1 | 7/2011 | Shipps et al. |
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2012/0015534 A1* | 1/2012 | Wavra ................... G06F 13/409 439/131 |
| 2012/0062173 A1 | 3/2012 | Choi et al. |
| 2012/0075571 A1 | 3/2012 | Silver |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0153903 A1 | 6/2012 | Kim et al. |
| 2012/0164943 A1 | 6/2012 | Bennett |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0206334 A1* | 8/2012 | Osterhout ............... G06F 1/163 345/156 |
| 2012/0280575 A1 | 11/2012 | Kim et al. |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0044128 A1* | 2/2013 | Liu ............................. G09G 5/00 345/633 |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chernokalov et al. |
| 2013/0062964 A1 | 3/2013 | Chernokalov et al. |
| 2013/0062965 A1 | 3/2013 | Chernokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |

(56) References Cited

U.S. PATENT DOCUMENTS

| | | |
|---|---|---|
| 2013/0082651 A1 | 4/2013 | Park et al. |
| 2013/0093255 A1 | 4/2013 | Jung et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0127410 A1 | 5/2013 | Park et al. |
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235332 A1 | 9/2013 | Blum et al. |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1 | 9/2013 | Belbey et al. |
| 2013/0252669 A1 | 9/2013 | Nhiayi |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0300204 A1 | 11/2013 | Partovi |
| 2013/0320736 A1 | 12/2013 | Teufel et al. |
| 2013/0329183 A1* | 12/2013 | Blum .............. G06F 3/011 351/158 |
| 2014/0021796 A1 | 1/2014 | Song et al. |
| 2014/0022765 A1 | 1/2014 | Waters |
| 2014/0027521 A1 | 1/2014 | Pedicano et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0058506 A1 | 2/2014 | Tai et al. |
| 2014/0062395 A1 | 3/2014 | Kwon |
| 2014/0065948 A1* | 3/2014 | Huang .............. H04B 1/3888 455/7 |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139407 A1* | 5/2014 | Abdollahi .......... G02B 27/0176 345/8 |
| 2014/0139637 A1 | 5/2014 | Mistry et al. |
| 2014/0140420 A1* | 5/2014 | Ghovanloo ....... H04W 52/0209 375/259 |
| 2014/0146282 A1 | 5/2014 | Lu |
| 2014/0152116 A1 | 6/2014 | Kim et al. |
| 2014/0152516 A1 | 6/2014 | Kim et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0222462 A1* | 8/2014 | Shakil ................ G06Q 10/0631 705/3 |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268017 A1 | 9/2014 | Sweis et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0016035 A1* | 1/2015 | Tussy .................. G06F 1/163 361/679.03 |
| 2015/0035991 A1 | 2/2015 | Sachs et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0072744 A1* | 3/2015 | Huang ................ H04B 1/3883 455/575.8 |
| 2015/0102995 A1 | 4/2015 | Shen et al. |
| 2015/0103304 A1 | 4/2015 | Darcy |
| 2015/0168727 A1 | 6/2015 | Qaddoura |
| 2015/0168729 A1 | 6/2015 | Kobayashi |
| 2015/0172538 A1* | 6/2015 | Nordstrom ........... H04N 5/2252 348/207.1 |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1* | 8/2015 | Marston ................ G02C 11/10 348/294 |

(56) References Cited

U.S. PATENT DOCUMENTS

| | | | |
|---|---|---|---|
| 2015/0249361 A1 | 9/2015 | Kim et al. | |
| 2015/0249916 A1 | 9/2015 | Schlub et al. | |
| 2015/0256021 A1 | 9/2015 | Kwon et al. | |
| 2015/0280763 A1* | 10/2015 | Ko | G06F 3/011 455/73 |
| 2015/0312533 A1* | 10/2015 | Moharir | H04N 7/185 348/14.02 |
| 2015/0366447 A1* | 12/2015 | Su | A61B 3/0008 351/206 |
| 2016/0011420 A1* | 1/2016 | Jang | G06F 3/0346 345/8 |
| 2016/0025996 A1 | 1/2016 | Bacon | |
| 2016/0026156 A1 | 1/2016 | Jackson et al. | |
| 2016/0033792 A1* | 2/2016 | Blum | G06F 3/167 348/294 |
| 2016/0037025 A1* | 2/2016 | Blum | G06F 1/1686 348/207.99 |
| 2016/0072296 A1 | 3/2016 | Nejatali et al. | |
| 2016/0104284 A1 | 4/2016 | Maguire et al. | |
| 2016/0125656 A1 | 5/2016 | James et al. | |
| 2016/0154239 A9 | 6/2016 | Layson, Jr. | |
| 2016/0163010 A1* | 6/2016 | Moharir | G06Q 50/24 348/14.02 |
| 2016/0172870 A1 | 6/2016 | Blum et al. | |
| 2016/0182826 A1* | 6/2016 | Blum | H02J 50/80 348/372 |
| 2016/0190859 A1 | 6/2016 | Blum et al. | |
| 2016/0203359 A1 | 7/2016 | von und zu Liechtenstein | |
| 2016/0206056 A1 | 7/2016 | Pluemer et al. | |
| 2016/0225191 A1 | 8/2016 | Mullins | |
| 2016/0261147 A1 | 9/2016 | Blum et al. | |
| 2016/0291327 A1* | 10/2016 | Kim | G06F 3/167 |
| 2016/0294225 A1* | 10/2016 | Blum | H02J 5/005 |
| 2016/0349533 A1 | 12/2016 | Grassi | |
| 2016/0363787 A1 | 12/2016 | Blum et al. | |
| 2017/0024612 A1 | 1/2017 | Wexler et al. | |
| 2017/0069192 A1 | 3/2017 | Sood et al. | |
| 2017/0127196 A1 | 5/2017 | Blum et al. | |
| 2017/0133953 A1* | 5/2017 | Gross | H02N 2/186 |
| 2017/0134645 A1 | 5/2017 | Kim et al. | |
| 2017/0147756 A1* | 5/2017 | Moharir | G10L 15/265 |
| 2017/0150049 A1 | 5/2017 | Blum et al. | |
| 2017/0185738 A1* | 6/2017 | Moharir | H04N 9/8042 |
| 2017/0195529 A1 | 7/2017 | Blum | |
| 2017/0223236 A1 | 8/2017 | Oberlander et al. | |
| 2017/0227779 A1* | 8/2017 | Kato | H04N 5/64 |
| 2017/0272640 A1 | 9/2017 | Fuller et al. | |
| 2017/0363885 A1 | 12/2017 | Blum et al. | |
| 2018/0042369 A1 | 2/2018 | Blum et al. | |
| 2018/0063433 A1 | 3/2018 | Blum et al. | |
| 2018/0143458 A1* | 5/2018 | Blum | H04N 5/2251 |
| 2019/0142256 A1* | 5/2019 | Zhao | A61B 1/0638 600/109 |

FOREIGN PATENT DOCUMENTS

| | | |
|---|---|---|
| CN | 202033546 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 4/2013 |
| CN | 203084344 U | 7/2013 |
| CN | 203178585 | 9/2013 |
| CN | 203708487 U | 7/2014 |
| CN | 104273891 A | 1/2015 |
| DE | 202009015991 | 4/2010 |
| EP | 0736268 | 10/1996 |
| ES | 2165795 | 3/2002 |
| GB | 2472120 A | 1/2011 |
| JP | 07099596 A | 4/1995 |
| JP | H08505238 A | 6/1996 |
| JP | 2000138858 A | 5/2000 |
| JP | 4006856 B2 | 11/2007 |
| JP | 2008067285 A | 3/2008 |
| JP | 2012063641 A | 3/2012 |
| KR | 101421046 B1 | 7/2014 |
| KR | 1020140091195 A | 7/2014 |
| KR | 101646541 | 8/2016 |
| TW | M300818 U | 11/2006 |
| TW | 200843277 A | 11/2008 |
| TW | M395176 U | 12/2010 |
| TW | 201145748 A1 | 12/2011 |
| TW | 201415753 A | 4/2014 |
| WO | 9208157 A1 | 5/1992 |
| WO | 0106298 A1 | 1/2001 |
| WO | 02/45044 A1 | 6/2002 |
| WO | 2009/052705 A1 | 4/2009 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | WO 2013-123264 A1 | 8/2013 |
| WO | 2013/188343 A1 | 12/2013 |
| WO | 2014/012536 A1 | 1/2014 |
| WO | 2014012451 A1 | 1/2014 |
| WO | 2014122538 A2 | 8/2014 |
| WO | 2016022499 A1 | 2/2016 |
| WO | 2016100339 A1 | 6/2016 |
| WO | 2016105480 A2 | 6/2016 |
| WO | 2016109577 A1 | 7/2016 |
| WO | 2016141349 A1 | 9/2016 |
| WO | 2016201261 A1 | 12/2016 |
| WO | 2016205373 A1 | 12/2016 |
| WO | 2017075405 | 5/2017 |
| WO | 20170223042 A1 | 12/2017 |
| WO | 20180031684 A1 | 2/2018 |

OTHER PUBLICATIONS

U.S. Appl. No. 15/917,413 entitled "Wireless Power Conversion System" filed Mar. 9, 2018, pp. all.
U.S. Appl. No. 15/627,759, filed Jun. 20, 2017 entitled "Image Alignment Systems and Methods", pp. all.
U.S. Appl. No. 15/672,971 entitled "Connectors for Attaching One or More Wearable Devices to Eyewear", filed Aug. 9, 2017; pp. all.
U.S. Appl. No. 15/789,574, entitled "Architecture for and Camera Devoid of Viewfinder", filed Oct. 20, 2017, pp. all.
U.S. Appl. No. 15/802,782 entitled "Wearable Camera System" filed Nov. 3, 2017, pp. all.
U.S. Appl. No. 15/842,112 entitled "Magnetic Attachment Mechanism for Electronic Wearable Device" filed Dec. 14, 2017, pp. all.
U.S. Appl. No. 15/843,639 entitled "Connectors for Attaching One or More Wearable Devices to Eyewear" filed Dec. 15, 2017, pp. all.
"Alpha—The World's Smallest 4K Action Camera", https://www.indiegogo.com/projects/alpha-the-world-s-smallest-4k-action-camera-sports; captured Oct. 9, 2017, pp. all.

(56) References Cited

OTHER PUBLICATIONS

"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, 1-16.

U.S. Appl. No. 29/588,270, entitled "Eyewear Temple", filed Dec. 19, 2016, pp. all.

Design U.S. Appl. No. 29/556,571, entitled "Eyewear Temple", filed Mar. 1, 2016; pp. all.

CT Band, , "Make Your Watch Smart!", http://www.ct-band.com/en/; captured Nov. 10, 2016, pp. all.

Griffin, , "Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILJBcOqYMmKeCs3g_rcvbST3HVWtuup_HzVQ3-Iv5YFOBoCcK_w_wcB; captured Nov. 10, 2016, pp. all.

Kairos "Kairos T-Band Only"; https://kairoswatches.com/tbands/tband/; captured Nov. 10, 2016, pp. all.

Kiwi Wearable Technologies Ltd. "Glance: World's First Smart Accessory for Your Watch", https://www.kickstarter.com/projects/1742184757/glance-worlds-first-smart-accessory-for-your-watch; captured Nov. 10, 2016, pp. all.

Lynnette "Fitbit Pouch for Watch Strap", https://www.etsy.com/listing/186507712/fitbit-pouch-for-watch-strap; captured Nov. 10, 2016, pp. all.

Main Tool "Classi: The World'S First Leather Smart Strap for Classic Watches", http://www.maintool.me/classi.html; captured Nov. 10, 2016, pp. all.

Marathon "Marathon Watch Band Clip Compass", http://www.chronoworld.com/marathon-watch-band-clip-compass-co194004.html; captured Nov. 10, 2016, pp. all.

Modillion "Modillion Turns Any "Dumb" Watch Into a Smart Watch", http://newsatlas.com/modillian-smartwatch-strap/32059/; captured Nov. 10, 2016, pp. all.

Montblac-Simplo GMBH "Wearable Technology Meets the Art of Fine Watchmaking", http://www.montblanc.com/en-us/discover/specials/montblanc-introduces-e-strap.html; captured Nov. 10, 2016, pp. all.

"Multi Functional Pouch Armband Ankel Band Wristband for Fitbit Flex Fitbit One Clip . . . ", https://www.amazon.com/functional-armband-wristband-smartband-withings/dp/B00WALZXCW; captured Nov. 10, 2016, pp. all.

"Review of 1Bandid Sports & GPS Watch ID Bands", https://www.dcrainmaker.com/2011/09/review-of-1bandid-sports-gps-watch-id.html; captured Nov. 10, 2016, pp. all.

"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.

Nico Gerard "Skyview Pinnacle", https://www.nicogerard.com/nico-gerard-skyview-pinnacle; captured Nov. 10, 2016, pp. all.

Taser International, Inc. "Taser Axon Flex System User Manual", Taser International Inc., 2015, p. 1-21.

Tombot "Custom Watchband Holder for Fitbit Flex", http://www.shapeways.com/product/YWXHN5VYP/custom-watchband-holder-for-fitbit-flex?optionId=17995763; captured Nov. 10, 2016, pp. all.

Ubirds "Unique" Hand-Made Strap Discretely Adds Smart Features to Any Watch, http://newatlas.com/unique-smartwatch-strap/39458/; captured Nov. 10, 2016, pp. all.

Wotch "Transform Your Wristwatch Into a Smart Device", http://www.wotch.de/; captured Nov. 10, 2016, pp. all.

International Search Report nd Written Opinion received for PCT Appl. No. PCT/US2017/060691, dated Jan. 19, 2018, pp. all.

U.S. Appl. No. 15/863,474, entitled "Wearable Camera Systems and Apparatus and Method for Attaching Camera Systems or Other Electronic Devices to Wearable Articles", filed Jan. 5, 2018, pp. all.

\* cited by examiner

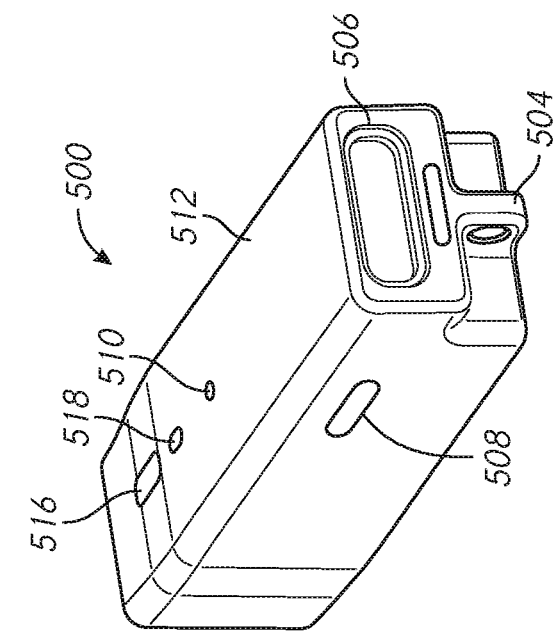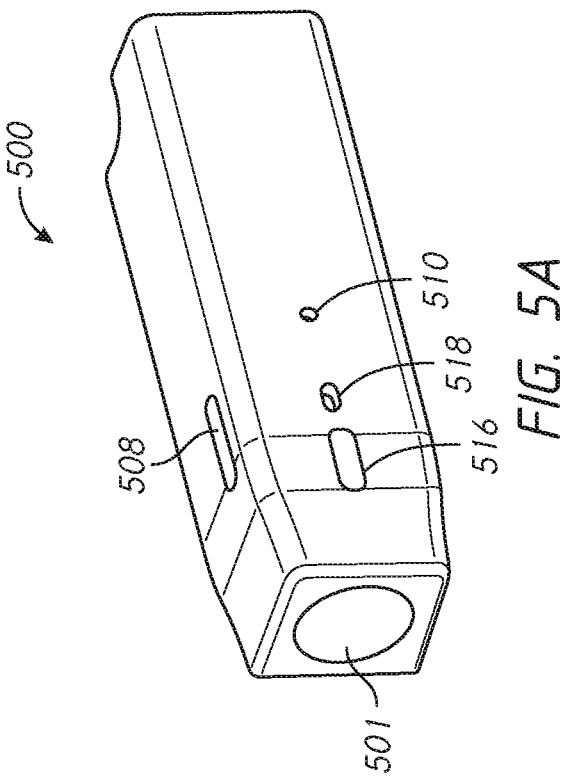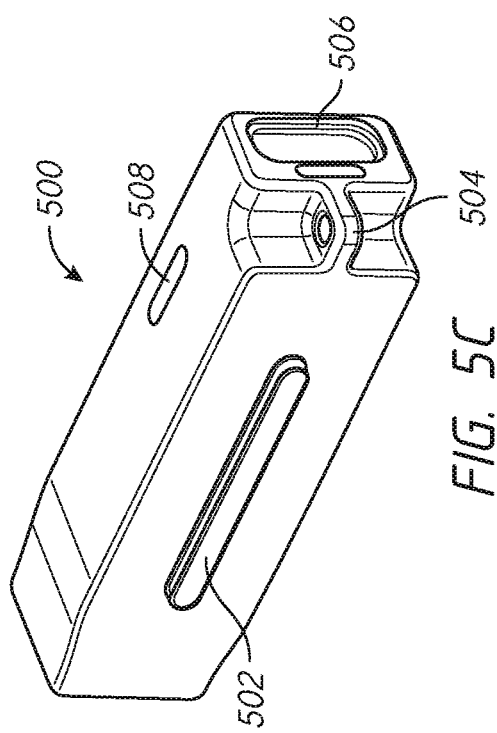

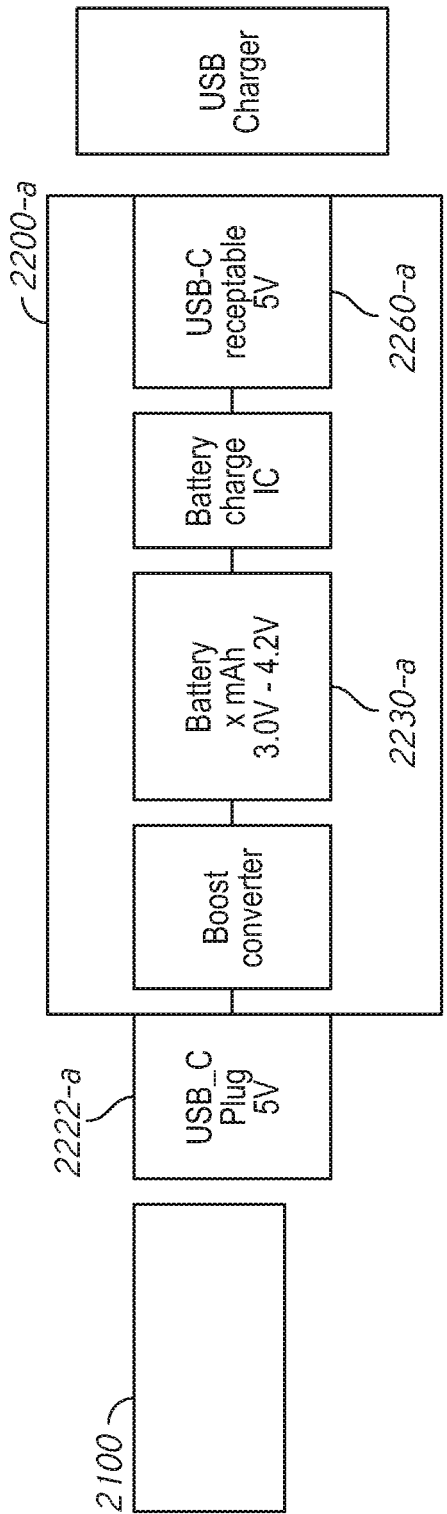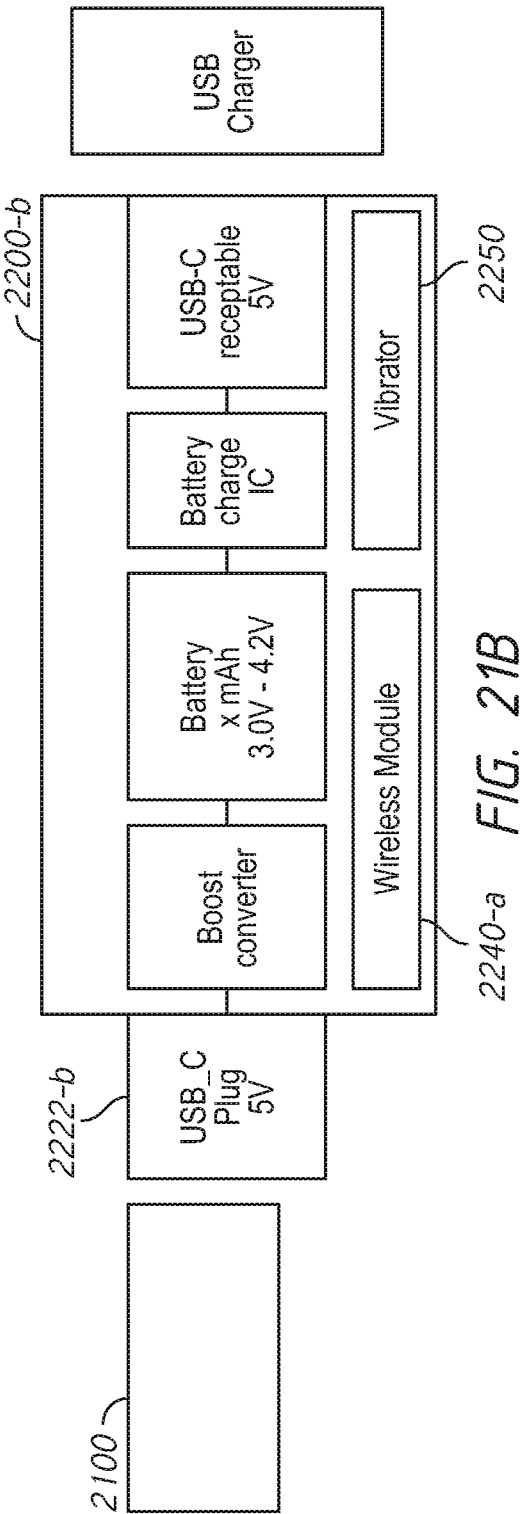

SMART CASE FOR ELECTRONIC WEARABLE DEVICE

CROSS-REFERENCE TO RELATED APPLICATIONS

This application claims the benefit under 35 U.S.C. 119 of the earlier filing date of U.S. Provisional Application No. 62/418,872 entitled "SMART ADAPTORS FOR MINIMIZING WEARABLE CAMERAS", filed Nov. 8, 2016. The aforementioned provisional application is hereby incorporated by reference in its entirety, for any purpose.

This application claims the benefit under 35 U.S.C. 119 of the earlier filing date of U.S. Provisional Application No. 62/447,404 entitled "SMART CASE, FOR MINIATURE WEARABLE CAMERA", filed Jan. 17, 2017. The aforementioned provisional application is hereby incorporated by reference in its entirety, for any purpose.

This application claims the benefit under 35 U.S.C. 119 of the earlier filing date of U.S. Provisional Application No. 62/461,579 entitled "ENHANCED SMART CASE", filed Feb. 21, 2017. The aforementioned provisional application is hereby incorporated by reference in its entirety, for any purpose.

This application claims the benefit under 35 U.S.C. 119 of the earlier filing date of U.S. Provisional Application No. 62/461,977 entitled "ENHANCED SMART CASE ENABLING AUGMENTED REALITY", filed Feb. 22, 2017. The aforementioned provisional application is hereby incorporated by reference in its entirety, for any purpose.

This application claims the benefit under 35 U.S.C. 119 of the earlier filing date of U.S. Provisional Application No. 62/464,075 entitled "SMART CASE WITH INTEGRATED DISPLAY FOR USE WITH A MINIATURE WEARABLE CAMERA", filed Feb. 27, 2017. The aforementioned provisional application is hereby incorporated by reference in its entirety, for any purpose.

This application claims the benefit under 35 U.S.C. 119 of the earlier filing date of U.S. Provisional Application No. 62/515,860 entitled "ATTACHABLE ACCESSORY FOR WEARABLE CAMERA", filed Jun. 6, 2017. The aforementioned provisional application is hereby incorporated by reference in its entirety, for any purpose.

TECHNICAL FIELD

The present disclosure relates to auxiliary units for electronic wearable devices such as wearable cameras, and in some specific examples to auxiliary units implemented in the form of a case or smart case for the electronic wearable device (e.g., camera).

BACKGROUND

When a consumer picks out eyewear, whether prescription or non-prescription, whether sunglasses of clear glasses the consumer almost always first looks at how the eyewear looks on their face. Wearable cameras have been attempted in the past and have not been commercially viable due to the size and form factor of the cameras. When the camera is integrated into eyewear such that electronics are embedded into the eyewear frame four issues occur; 1) the eyewear frame gets thicker, 2) the cost of goods of the eyewear frame increase, 3) the selling price to the consumer of the eyewear frame increases and 4) the selection of different style eyewear frames decreases for the consumer to select from. Cameras attachable to eyewear are typically too large and may distract from the fashion look of the eyewear frame. Thus there may be a need for a small camera that is attachable and detachable to eyewear without harming the fashion look of the eyewear frame.

Cameras are continuing to shrink in size and form factor. Wearable cameras, such as (by way of example only) those which attach to eyewear, continue to push boundaries of size, weight and form factor reduction, while at the same time maintaining acceptable functionality. There is a pressing need for an innovative solution that allows for further size and form factor reductions in wearable cameras while maintaining acceptable functionality. It is also desirable to have a closed or sealed camera with no physical connectors between the camera and the outside world. Such a camera could be made to be water proof and would never need to be plugged into a device for charging or data transfer.

SUMMARY

In accordance with some embodiments herein, a case for a wearable electronic device such as a wearable camera having onboard memory and power source may include a case body comprising a camera interface configured to communicatively connect the case to the wearable camera, an external communication interface configured to communicatively couple the case to a computing device, a case memory configured to store data received from the camera, and a case battery comprising a rechargeable power source configured to provide power to the camera, wherein the case body may have a configuration in which the case body at least partially encloses the camera. In certain embodiments the case can recharge the camera. In some embodiments the case is configured to recharge the camera and transfer data to a computing device. In other embodiments, the case is configured to recharge the camera, store data, and transfer data to a computing device. In still other embodiments, the case is configured to recharge the camera, store data, enhance the data, and transfer data to a computing device. A computing device can be one of a laptop computer, desktop computer, smart phone, tablet, augmented reality unit, virtual reality unit, mixed reality unit, or any other computing device. The case can be mobile in that it can function, for example recharge a camera, while the case is not connected to an external power source.

BRIEF DESCRIPTION OF THE DRAWINGS

Features, aspects and attendant advantages of the present invention will become apparent from the following detailed description of various embodiments, including the best mode presently contemplated of practicing the invention, when taken in conjunction with the accompanying drawings, in which:

FIGS. 5A-5C show several isometric views of an example wearable camera in accordance with some examples of the present disclosure;

FIGS. 21A-21D show block diagrams of auxiliary units connectable as an extension to a wearable electronic device according to further examples of the present disclosure.

DETAILED DESCRIPTION

Figure 1:
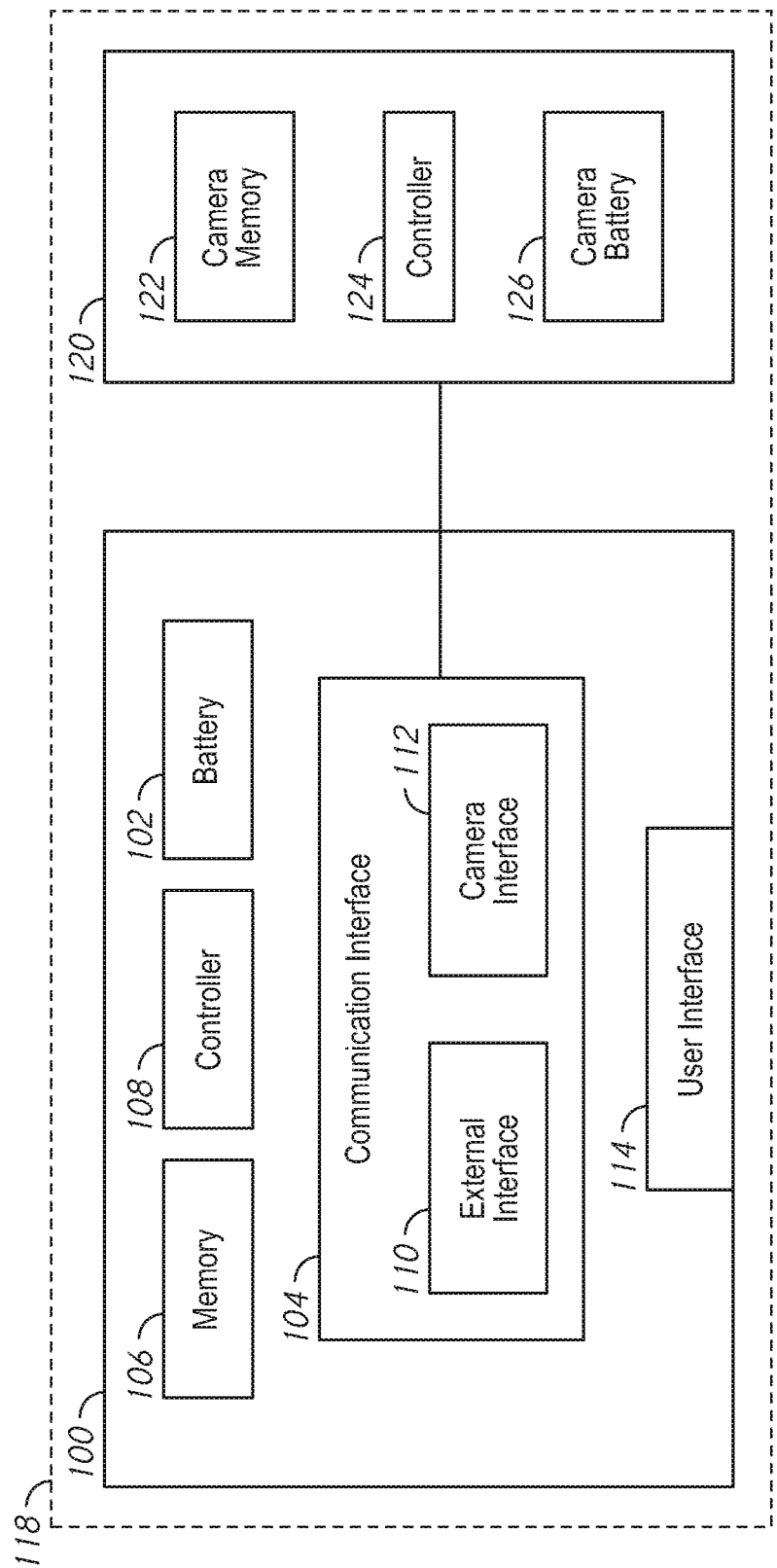
FIG. 1 shows a block diagram of an auxiliary unit in accordance with some examples of the present disclosure.

This present application describes camera systems and auxiliary units which enable further reduction of size of electronic wearable devices, such as a wearable camera. In some embodiments, the wearable camera may be attachable to one or any number of different types of wearable articles, for example eyewear, a purse, a ring, a necklace, a piece of clothing, or any type of protective gear worn by a person (e.g., helmet, goggles, a ski mask, a scuba mask, etc.). In certain other embodiments the camera can be worn, then removed and reattached to another surface such as, by way of example only, a surface of an automobile dash board, motorcycle, bicycle, skateboard, surfboard. The present application describes examples of auxiliary units (e.g., an adaptor, smart cable, a carrying case, a smart case, or other), which may be configured to couple to an electronic wearable devices, e.g. a wearable camera, such that one or more components of the case can provide functionality to the wearable device, e.g., functionality which may otherwise need to be located in the wearable camera, and in this manner further reduction in size of the camera may be achieved. For example, such a component may be an electronic component such as communication circuitry, an interface (e.g., for interfacing with another electronic device or a user), a power source, memory, or power and/or memory management circuitry. In accordance with examples herein, an auxiliary unit may be configured to couple to a wearable electronic device such as a camera and provide auxiliary functionality to the camera. In some embodiments, similar functionality and/or components may reside in both the wearable device and the auxiliary unit, wherein the presence of the similar functionality and/or components allows for the functionality and/or components in the wearable device to be more minimized in terms of size and power consumption. In some examples, the auxiliary unit may be implemented as a case for the camera in that it may include at least on configuration in which the auxiliary unit or case encloses (at least partially or in some cases fully) the camera. In some such examples, the camera may be mechanically joined to the case such as by plugging the camera into a connector of the case, and in such instances also simultaneously providing a communication link between the cameras. In some examples the mechanical connection between the camera and case may not provide a communication link and may serve purely to secure the camera to the case.

The auxiliary unit may include internal electronic components such as communication circuitry, e.g., wired communication circuitry and one or more accompanying connector or plug (e.g., a USB or micro-USB connector, a LIGHTNING connector, etc.), wireless communication circuitry (e.g., a Wi-Fi chip, a Bluetooth chip, etc.), authentication circuit, which can be provided on EPROM or other type of non-volatile memory, a data storage component (e.g., flash or other type of non-volatile memory), battery charging and power management circuitry. In some embodiments, the auxiliary unit may include a power source (e.g., a rechargeable battery) for recharging the onboard power source of the electronic wearable device, (e.g., camera) when the electronic wearable device is coupled thereto. In some embodiments, the auxiliary unit may not be a smart device (e.g., may not include algorithms that have adaptive features or it may not have electronic components for data storage and/or external communication but may instead include only a power source and associated circuitry to enable charging of the electronic wearable device on the go. In some such examples, the auxiliary unit may be implemented in the form of a case for storage of the electronic wearable device when not in use. In such examples, the auxiliary unit or case may have a configuration in which the auxiliary unit or case at least partially encloses the camera, which in the context of this application may be understood to imply that the auxiliary unit or case at least partially surrounds the camera (e.g., at least partially surround two or more sides of the camera). In some embodiments, the auxiliary unit or case may fully enclose the camera (i.e. surrounding all sides of the camera).

In some embodiments, the auxiliary unit may be configured to wirelessly charge the camera and may thus include wireless power transmission components (e.g., a wireless power transmitting coil such as to enable inductive charging of the camera). In some embodiments, the auxiliary unit may be configured to be wirelessly recharged and may thus include wireless power reception components (e.g., a wireless power receiver including a wireless power receiving coil). In some embodiments, the auxiliary unit may be configured to be both wirelessly recharged and to wirelessly charge the camera. In some such examples, the auxiliary unit may use the same coil for reception and transmission of power. In other such examples, the auxiliary unit may have separate transmitting and receiving coils.

In yet further examples, the auxiliary unit may be configured to be communicatively coupled to the camera using a wired connection. In some such examples, the auxiliary unit may have a wired connection for coupling to the camera for power transfer to the camera and/or for data transfer to/from the camera. In some examples, the auxiliary unit may additionally or alternatively use a wired connection for communication with an external device, for example an external computing device, such as a portable computer, tablet, smart phone or other portable computing device, a cloud server, or an external power source. In some embodiments, the auxiliary unit may use the same communication interface for connecting to the electronic wearable device (e.g., wearable camera) and the external device (e.g., external portable computing device or external power source). For example, the auxiliary unit may include a wired interface (e.g., USB, micro USB, LIGHTNING connector) for connecting the camera thereto (e.g., for charging) and may be further configured to use the same wired interface for connecting to an external device, such as a smart phone or a grid-connected power source, when the wired interface is not in use by the camera. In some embodiments, the common interface may be a wireless interface, e.g., a wireless power transmission/reception module, a wireless data transmission/reception module, or a combination thereof. In other examples, the auxiliary unit may have separate interfaces for connecting to the camera and for connecting to external devices. In yet further examples, the auxiliary unit may have at least one wired interface (e.g., for connecting to the camera and transmitting power and/or data to the camera, or for connecting to an external device) and at least one wireless interface (e.g., a Wi-Fi or Bluetooth interface for data transfer between the camera and auxiliary unit or between the auxiliary unit and external device, and/or a wireless power transmission/reception circuitry).

In some embodiments, the auxiliary unit may be portable (e.g., sized to be hand carried or otherwise conveniently fit in a user's pocket or purse and not requiring it to be plugged into a wall power source during use, e.g., during charging of the camera and/or reception of data from the camera). In some embodiments, the auxiliary unit may include a user interface, which may include one or more buttons, indicators (e.g., one or more LEDs), vibrators, buzzers, GPS, time stamp, clock display, remote display viewfinder for the camera. In some embodiments, the auxiliary unit can act as a remote control for causing the distance separated camera to capture a photo or video. This can be accomplished, by way of example only, while the auxiliary unit is stored in one's pocket and the camera is attached to eyewear. In some embodiments, the auxiliary unit may include additional computational power to post process image data from the camera, for example, the auxiliary unit may compress further the image files, or perform a formal conversion of the video or still data files, before the image files are transferred outside the auxiliary unit to an external computer or smartphone.

Further examples of the present disclosure are described now with reference to the figures. FIG. 1 shows a block diagram of an auxiliary unit 100. The auxiliary unit 100 may include at least one power source (e.g., auxiliary unit battery 102 or simply auxiliary battery, which may be rechargeable). The auxiliary unit 100 may include a communication interface 104 for coupling the auxiliary unit 100 to an electronic wearable device (EWD), in this case a camera 120. This interface may be referred to as a EWD interface (in the illustrated example, a camera interface 112) and it may be either wired or wireless. The camera 120 may include onboard memory 122, power 126, and a controller 124. The onboard memory 122 may be configured to store images (e.g., one or more photos, video, or any combination thereof) captured by the camera. The controller 124 may be configured to control functions (e.g., control initiation of image capture, control or perform signal processing of raw image data, enhance images captured by the camera, monitor camera status, and other functions) of the camera 120.

In some embodiments, the power source of the auxiliary unit (e.g., battery 102) may have greater power storage capacity than the power storage capacity of the camera battery 126. By reducing the size of the camera battery, further reduction in size of the camera may be achieved. The camera battery may be rechargeable by the auxiliary unit 100 when the camera is connected, e.g., physically via a wired connection or wirelessly, in the case wireless power transfer, to the auxiliary unit 100.

In some embodiments, the auxiliary unit may additionally and optionally include memory 16, for example for storing data (e.g., images) received from the camera 2. In such embodiments, the communication interface 14 may be further configured to enable data transfer from and/or to the camera 2. The auxiliary unit may include power management and/or data management circuitry, which may be implemented in a controller 18. The auxiliary unit may be referred to as a smart device in that it may include a controller 18, which may be implemented using one or more microprocessors, memory and memory for providing functionality to the camera (e.g., expanded memory storage and external communication capability) and/or user (e.g., indicating status of the camera and/or auxiliary unit) beyond simply being used to recharge the camera. Such a controller may be a MCU, an FPGA or an ASIC. In some embodiments, certain control operations, sensing operations, actuating operations, and storing operations of the auxiliary unit may require ramping of operating voltage which may be triggered only when its function is called for, in order to further minimize energy consumption.

In some embodiment, the camera 2 may not include any communication components for coupling to external computing device. These communication components may be offloaded to the auxiliary unit 10. The auxiliary unit 10 may include components for additionally communicatively coupling the auxiliary unit 10 to an external device. In some embodiments, the auxiliary unit 10 may include an external communication interface 22, which may be wireless or wired, for coupling the auxiliary unit 10 to an external device (e.g., a smart phone, a laptop computer, a tablet, a desktop computer, a server computer such as in the cloud, etc.). The auxiliary unit may thus provide the necessary circuitry for the camera to be able to communicate with external devices.

In some embodiments, the adaptor may additionally or alternatively be embodied in a housing 28 which functions as a carrying case to store the camera when not in use (e.g., to protect sensitive components of the camera, such as the lens). For example, the auxiliary unit may be implemented as a smart case that can support the functionalities of a wearable camera, including, but not limited to providing recharging capability and/or downloading data from the device thus freeing up its memory, and providing a secure storage space for the device, when not in use. The smart case can enable deployment of electronic wearable devices (e.g., wearable cameras) with smaller memory chips, power management modules and smaller rechargeable batteries, thus reducing the profile of the electronic wearable device, and enhancing usability. This is accomplished by off-loading to the case certain functionality normally found in the wearable electronic device. Among other wearable devices that benefit from having a smart case to provide operational support may be eyewear or attachments to eyewear which can display augmented reality (AR). In some embodiments the communication interface may include all the necessary components to interface with APPLE products and the iOS operating system, e.g., through the APPLE proprietary LIGHTNING connector. In some embodiments the communication interface may include components for interfacing with an ANDROID device, for example through a USB or micro USB connector. The term USB as used herein in the context of describing a connector, port, plug or interface would be understood to include any type of USB connector, port, plug or interface currently know or later developed, for example mini and micro USB.

Figure 2:
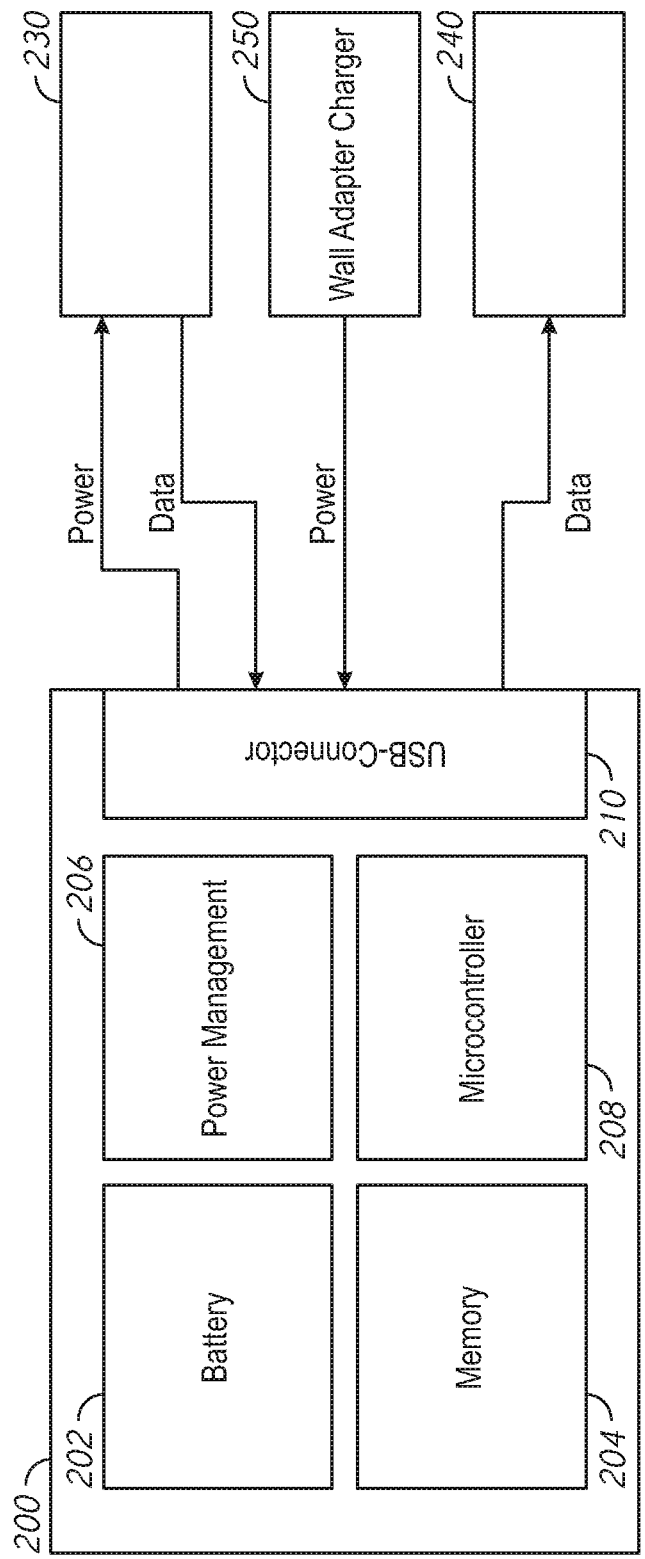
FIG. 2 shows a block diagram of an auxiliary unit in accordance with further examples of the present disclosure.
Figure 3A:
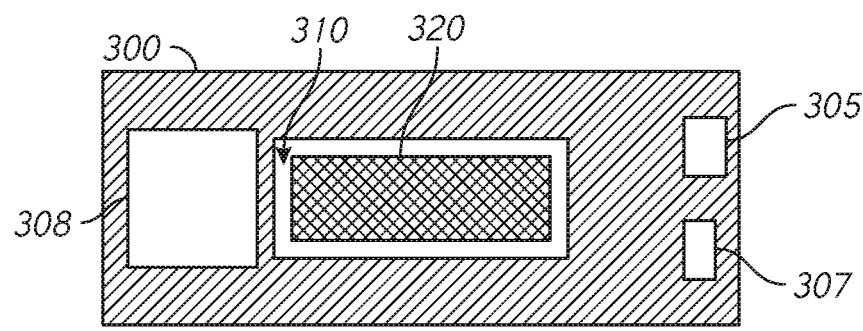
FIGS. 3A-3D show examples of auxiliary units and docked cameras in accordance with some examples of the present disclosure.
Figure 3B:
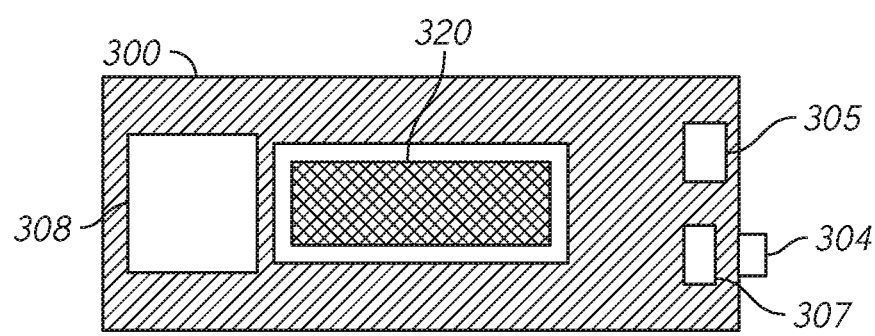
Figure 3C:
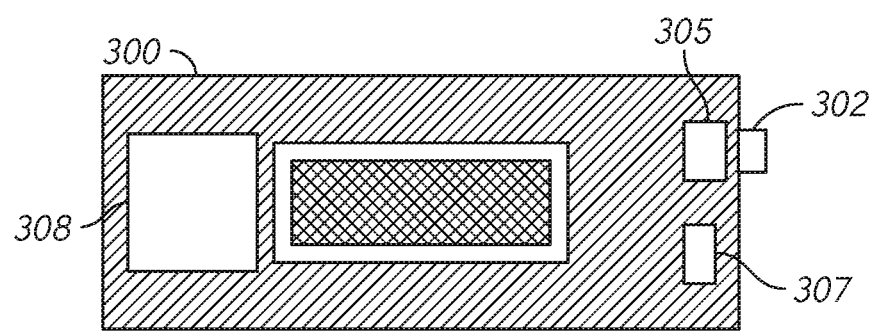
Figure 3D:
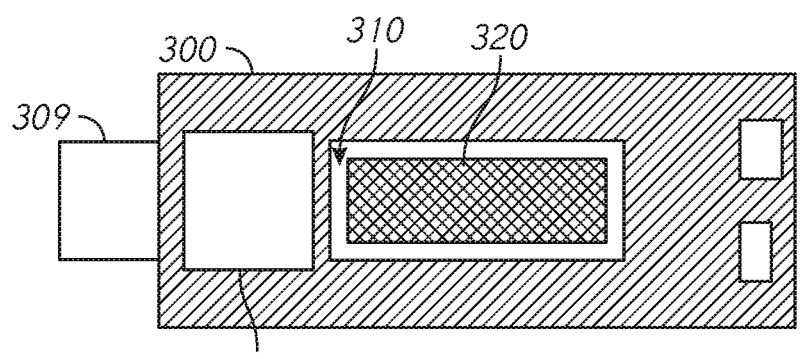

FIG. 2 shows auxiliary unit, which may also be referred to as auxiliary unit, in accordance with some examples of the present disclosure. The auxiliary unit 200 may be configured to be connected to a camera 230. The auxiliary unit 200 may include a battery 202 for charging the camera 230. In some examples, the battery 202 may have capacity from about 100 to about 200 mAH. In some examples, the battery's capacity may be up to about 1000 mAH, or 4 WH. In some examples, the battery 202 may have greater power storage capacity than the power storage capacity of the camera's onboard power source. In some embodiments, where Wi-Fi, file compression, or other power intensive functionalities reside in the auxiliary unit, the battery 202 may be very large, in some cases over 1000 mAH or even 2500 mAH.

In some examples, the auxiliary unit 200 may additionally or alternatively include memory 204. The memory 204 may include volatile memory, non-volatile memory, or both. In some examples, the memory 204 may include non-volatile memory, such as flash memory. In some examples, multiple non-volatile memories may be provided such as a flash memory and an EEPROM as well as volatile memories such as a RAM. In some embodiments, the EEPROM may be utilized to embed algorithms for signal processing, while the flash memory may be embedded with signal compression algorithms. In some examples, the storage capacity of the memory 204 may be 32 Gbytes or greater. In some embodiments, the storage capacity of the auxiliary unit's memory may be greater than that of the camera 230. In other examples, the adaptor memory's capacity may be the same as or smaller than that of the camera. In some examples the capacity may be less than 32 Gbytes, or less than 16 Gbytes. In some embodiments, the memory 204 may have minimal storage capacity and be configured to store no or very few photos or video files. In some examples, the memory 204 may include only volatile memory, such as RAM. In some examples, the auxiliary unit 200 may not be configured for storing images received from the camera but may only buffer data (e.g., images) received from the camera prior to it being transmitted to an external device for storage such as a smart phone, a laptop, or a server on the cloud. That is, in such examples, the auxiliary unit 200 may act only as a pass through for any image data rather than providing image storage functionality. The auxiliary unit 200 may include a power management module 206, a data management module (not shown), or both.

The power management module can monitor power needs of the auxiliary unit and/or the camera being connected thereto, provide an alert when power of the adaptor or camera is too low, and implement a recharging procedure of the camera following a protocol that is programmed in the power management module. The data management module can include or be operatively associated with internal adaptor memory (e.g., memory 204) for storing data (e.g., photographs, audio and video files, or other data received from the camera, configuration data, executable instructions, etc.) and implement a data management protocol for transferring data from the camera, between the camera and an external device, for erasing data from the camera, the adaptor, or both, and for monitoring memory capacity. In some embodiments, the adaptor has at least 1 Gigabyte of internal memory. In some embodiments, the adaptor has at least 32 Gigabytes of internal memory. In some embodiments, the adaptor 200 may include a microcontroller 208, which may be programmed to perform the functions of the power management module, the data management module, or both. The microcontroller can have embedded firmware that can perform data processing tasks required for improvement of image quality. The case can transmit data to an APP comprising said remote device. The microcontroller 208 may include firmware that reprograms the firmware of the image sensor of the camera module. The firmware can perform image stabilization.

The auxiliary unit 200 may communication interface 207 for connecting the adaptor 200 to the camera 230, an external power source 250, an external computing device 240, or any combination thereof. The communication interface 207 may include one or more wired or wireless interfaces. For example, the communication interface 207 may include any number of wired interfaces 210 such as a USB interface, a LIGHTNING interface, or other standardized or proprietary wired interfaces now known or later developed.

FIGS. 3A-3D show configurations of an example auxiliary unit according to the present disclosure. The auxiliary unit 300 may include any or all of the components of auxiliary units according to any of the examples herein, for example the components of auxiliary unit 200. The auxiliary unit 300 may be implemented as a docking station or case which is designed for docking or receiving the EWD (e.g., camera 320). As such, the auxiliary unit 300 may include at least one configuration in which the auxiliary unit at least partially encloses the electronic wearable device (e.g., camera 320). In some embodiments, the auxiliary unit 300 may fully enclose the electronic wearable device (e.g., camera 320). The auxiliary unit 300 may include a dock or receptacle configured to receive the camera 320. The dock or receptacle may be configured such that the camera when received therein is surrounded, at least partially, on two or more sides, on three or more sides, on four or more sides, on five or more sides, or on all sides. In some examples, the dock or receptacle may be configured such that the camera, when received in the auxiliary unit, is surrounded on all sounds for example fully surrounded on all sides.

The auxiliary unit 300 may include at least one external interface, e.g., for connecting the adaptor to external power and/or for connecting the auxiliary unit to a mobile computing device, and a camera interface for communicatively connecting the auxiliary unit 300 to the camera. The camera interface may be integrated with the dock 310. The external interface may include one or a plurality of wired connectors, for example a first connector 309 (e.g., a USB connector for plugging the auxiliary unit 300 to external power), a second connector 302 (e.g., a micro USB connector for connecting the auxiliary unit to an ANDROID device) and a third connector 304 (e.g., a LIGHTNING connector for connecting the auxiliary unit 300 to a iOS device). While three separate connectors are shown in this example, it will be understood that the external interface may include any number of connectors including fewer or greater number of connectors. In some embodiments, the external interface may be entirely or at least partially wireless.

Any one or more of the connectors may be configured to be at least partially concealed when not in use. For example, the adaptor 300 may have one or more user-operated actuators (e.g., buttons, switches, or sliders) which may be operable to at least partially conceal and/or expose the desired connector for use. For example, adaptor 300 may include a first actuator 308 configured to extend and retract a USB connector. The adaptor 300 may include a second actuator 305 configured to extend and retract another one of the connectors, for example the micro USB connector 302. The adaptor 300 may include a third actuator configured to extend and retract yet another one of the connectors, e.g., the LIGHTNING connector 304. In some embodiments, a single actuator may be configured to actuate two or more connectors. For example, in the case of male connectors, a single actuator may be configured to extend a male micro USB connector while retracting a male LIGHTNING connector and conversely to extend the male LIGHTNING connector while retracting the male micro USB connector. In the case of female connectors, a single actuator, such as a slider or door, may be operable to conceal one female connector, such as a female micro USB connector, while exposing a second female connector such as a female LIGHTNING connector and vice versa. Any combination of male and female connectors may be used for the communication interface of the auxiliary unit and other variations or combinations of actuators (e.g., buttons, switches, sliders, etc.) may be used to expose or activate one connector while concealing or deactivating another connector. In some embodiments, the auxiliary unit 300 may be configured as a case such that it has at least one configuration in which the camera 320 is at least partially enclosed. In such embodiments, one or more of the connectors of the adaptor 300 may be exposed or concealed by virtue of providing the adaptor between an open configuration (e.g., to receive the camera) and a closed configuration (e.g., in which the camera is docked or enclosed by the case).

Figure 4:
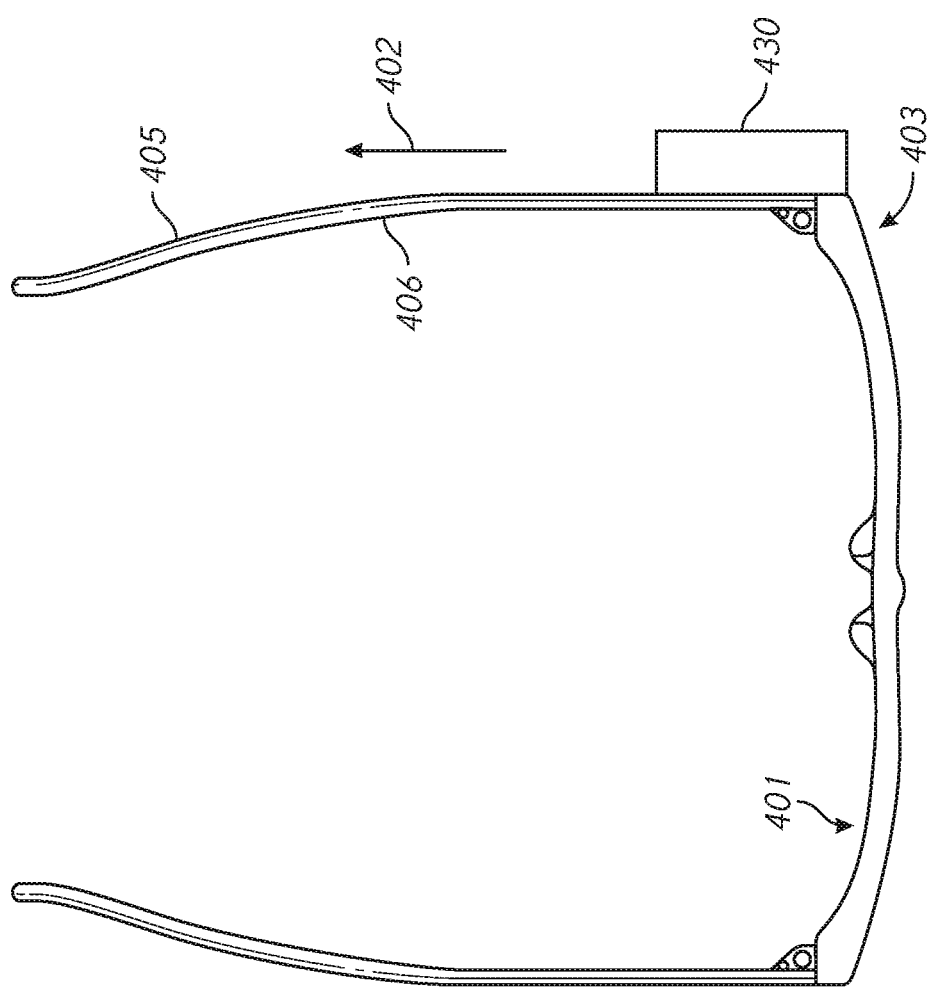
FIG. 4 shows an illustration of a wearable camera attached to a wearable article, in this case eyewear, in accordance with some examples of the present disclosure.

FIG. 4 shows a wearable camera 430 attached to a wearable article 401, in this case eyewear 405. The camera 430 is illustrated attached to a temple 406 of the eyewear. In some examples, the camera 430 may be movably attached to the eyewear (e.g., as indicated by arrow 402) such that the camera is positionable at multiple positions along the length of the temple including a position in which the camera is flush with or in front of the eyewear temple front 403. In some examples, the camera may be configured to be positionable such that it is in front of the forward-most portion of the eyewear. The wearable camera is positionable at different locations on the temple, e.g., in order to minimize its peripheral profile and thus limit or eliminate loss of peripheral field of view. Wearable cameras having too large a form factor and fixed frontward positions may cause visual disturbance due to the appearance of blind spots in the field of view and such problems may be alleviated by examples of the present disclosure. The camera may be attachable to a wearable article such as eyewear in accordance with any of the examples described in U.S. application Ser. No. 14/816,995, filed Aug. 3, 2015 and published as 2016-0033792, and U.S. application Ser. No. 15/179,018, filed Jun. 10, 2016 and published as 2016-0363787, the content of which applications is incorporated herein by reference in its entirety for any purpose.

FIGS. 5A-5C show views of a wearable camera 500. As described herein, the camera 500 may include an image sensor which may be located behind lens 501. The image sensor may be configured to capture image data, which may be stored in onboard camera memory. The camera 500 may also include a battery and an interface 506 for connecting the camera 500 to an auxiliary unit which may augment the functionality to the camera. In some cases, the interface 506 may be configured to additionally or alternatively enable the camera 500 to be connected to a number of different external devices, such as an external power source connected to the grid, a computing device, or other. In some examples, the camera 500 may include a wired interface such as a USB port, in some cases a female micro USB port. The camera 500 may include one or more user control components 508 (e.g., one or more mechanical buttons or switches or touch sensitive surfaces such as capacitive switches), one or more indicators 516, a microphone 510, and a speaker 518. The camera may include an attachment member for removably and/or movably coupling the camera to eyewear. In some embodiments, the camera may be attachable to the eyewear via magnetic means. The camera may include additional features 504 for securing the camera to the article other than by magnetic means. The camera may be implemented in accordance with any of the examples described in U.S. application Ser. No. 14/757,753, filed Dec. 23, 2015 and published as 2016-0182826, and U.S. application Ser. No. 15/627,759, filed Jun. 20, 2017, the content of which applications is incorporated herein by reference in its entirety for any purpose.

Figure 6:
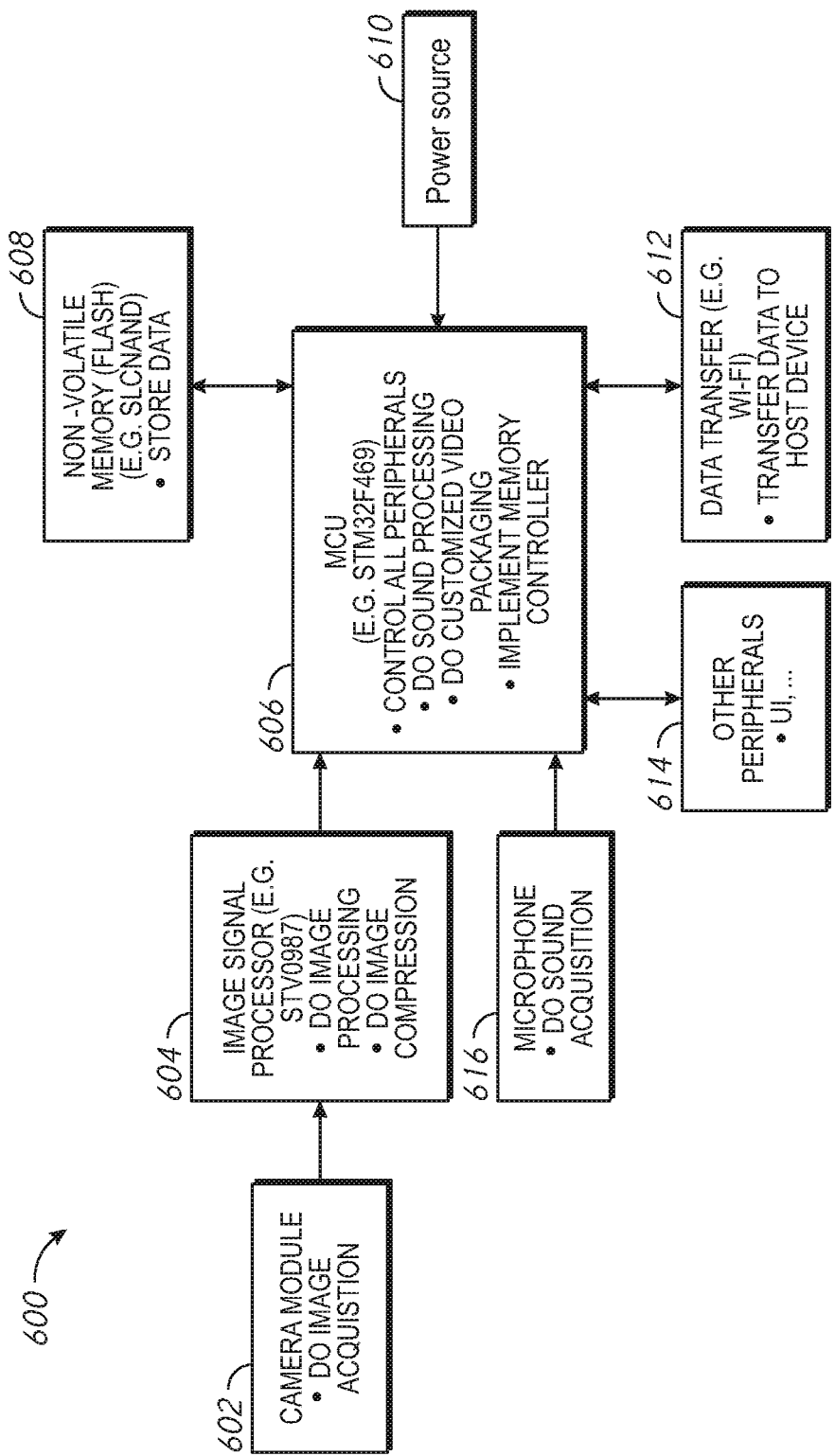
FIG. 6 shows a block diagram of internal components of a wearable camera in accordance with some examples of the present disclosure.

FIG. 6 shows a block diagram of internal components of a wearable camera. The camera may include image sensor 602, image signal processor 604, microcontroller unit 606, flash memory 608, Wi-Fi chip 612, peripheral(s) 614, and microphone 616. The image sensor 602 may be coupled to image signal processor 604, which may be coupled to microcontroller unit 606. The microcontroller unit 606 may be coupled to flash memory 608, Wi-Fi chip 612, microphone 616, and peripheral(s) 614. Additional, fewer, and/or different components may be used in some examples. The image sensor 602 may be configured to generate image data. The image signal processor 604 may be coupled to image sensor 602 and receive image data from the image sensor 602 for processing, e.g., compression, color balancing, image centering, image quality enhancement, etc. The flash memory 608 may be coupled to microcontroller unit 606 and may receive data (e.g., image data) for storage. The microcontroller unit 606 may include firmware to perform functions of the camera, such as image capture, memory access, control external data communication and one or more interfaces, peripherals, and feedback devices (e.g., microphone, light indicators, etc.). Such an approach may, in some embodiments, be preferable to embedding signal processing algorithms in the firmware controlling the image processor (i.e., on the camera), as the camera can thus be made more compact. The camera may also include onboard power source 610, which may be recharged via a wired or wireless power transfer from an external source such as the auxiliary unit, a wall power charger, or another computing device such as a laptop, a smartphone, etc. The wearable camera of the present disclosure may be implemented further in accordance with any of the examples described in U.S. application Ser. No. 15/789,574, filed Oct. 20, 2017, the content of which application is incorporated herein by reference in its entirety for any purpose.

Figure 7:
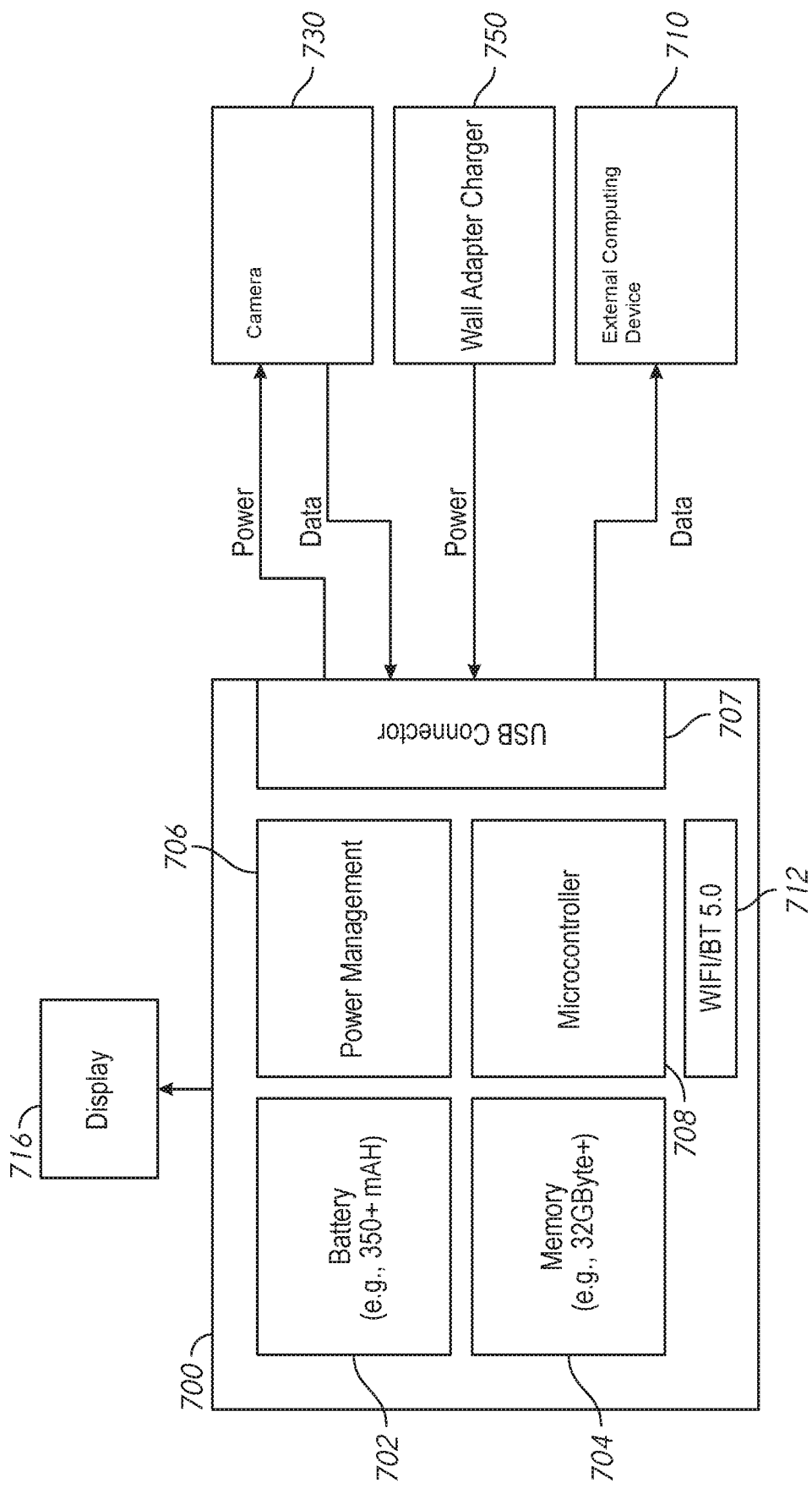
FIG. 7 shows a block diagram of an auxiliary unit in accordance with further examples of the present disclosure.

FIG. 7 shows a block diagram of an auxiliary unit according to further examples. The auxiliary unit 700 may include one or more of the components of an auxiliary unit in accordance with any combination described herein (e.g., auxiliary units 100, 200, 1610, etc.). For example, the auxiliary unit 700 may include a power source such as a rechargeable battery 702, a memory 704, a power management module 706, a microcontroller unit 708, and at least one communication component (e.g., wired interface 707 for connecting to a wearable electronic device (e.g., camera 730), an external power source 750, an external computing device (e.g., smart phone 710), or any combination thereof. The auxiliary unit 700 may include one or more wireless interfaces 712, which may include a wireless transmitter/receiver such as a Wi-Fi, Bluetooth, or other type of wireless data transmitter/receiver (e.g., 3G, 4G, LTE cellular transmitter/receiver). In some embodiments, the wireless interface 712 may be configured to communicate with another computing device via IEEE 802.15.1(Bluetooth and BLE), IEEE 802.11WIFI, IEEE 802.15.4(ZigBee), IEEE 802.16 (WiMAX), or other form of wireless technologies currently known, currently being developed, or that are developed in the future. The wireless interface may be configured to provide a data link between the auxiliary unit 700 and external computing devices (e.g., a mobile computing device such as a smartphones, a table, a laptop, etc.) and in some embodiments, the data link may be configured to enable data transfer at a rate of at least ⅕ Mbytes/sec.

The auxiliary unit 700 may include a user interface. The user interface may include one or more indicators, buttons or other input devices, a display 716, and/or a speaker. The display can be, by way of example only, an OLED, LCD, LED display. In some embodiments, the case may have one or more actuators (e.g., a button or slider) which exposes or conceal connector plug(s) associated with a wired interface, if present. In some embodiments, the auxiliary unit may be configured for wireless power transfer. For example, the auxiliary unit may include a wireless power transmitter/receiver, for example a coil for transmitting power wirelessly to the camera and/or for receiving power wirelessly for charging the battery 702. In some embodiments, the auxiliary unit may include charge level indicators for the camera and the auxiliary unit by way of example only, using LED arrays, as well as a micro display for previewing videos and stills, as well as, a means of providing other status information about the camera and the auxiliary unit. In certain embodiments the auxiliary unit can contain a projector. The projector can project images (photo or video) that have been captured by the camera.

Figure 8A:
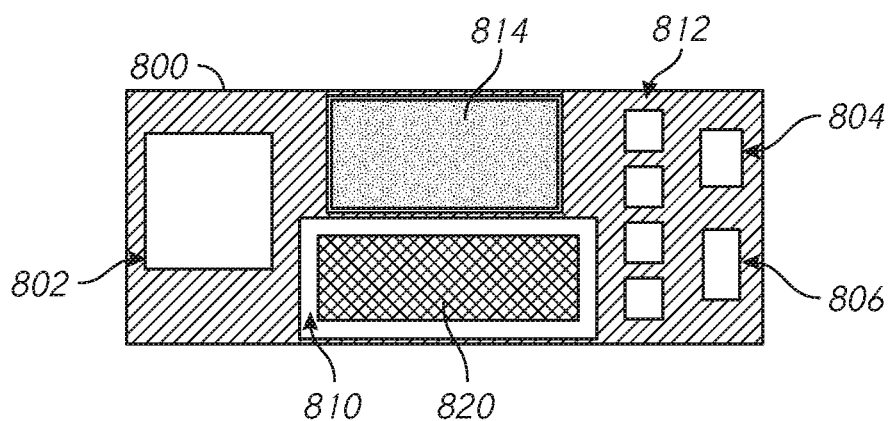
FIGS. 8A and 8B show further examples of auxiliary units and docked cameras in accordance with examples of the present disclosure.
Figure 8B:
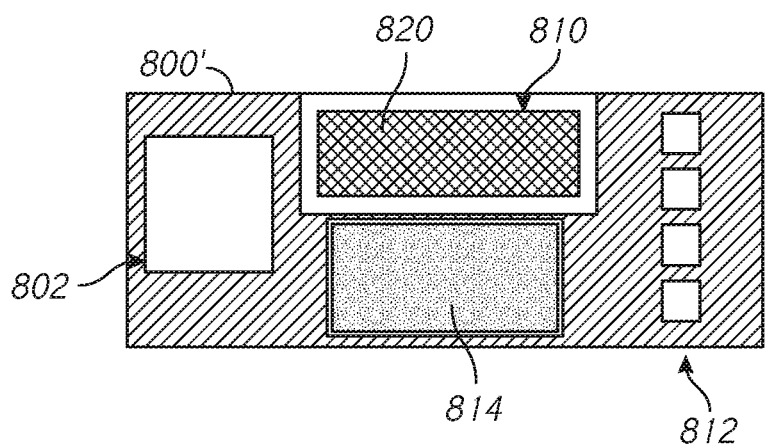

FIGS. 8A and 8B show further examples of auxiliary units, also referred to as auxiliary units 800 and 800' according to the present disclosure. The auxiliary units 800, 800', similar to auxiliary unit 300, may include a dock 810 configured to receive camera 820. The auxiliary units 800, 800' may also include one or more wired connectors and/or one or more wireless connectors and actuators for activating the one or more connectors. Both auxiliary units 800 and 800' may include at least one a wired connector (e.g., a USB connector 802) for example for connecting the auxiliary unit 800, 800' to external power. The auxiliary unit 800 may further include a combination of wired (e.g., USB type C, micro USB 304, LIGHTNING 806, etc.) and wireless connectors, for example for connecting the auxiliary unit 800 to a mobile computing device such as a smart phone, a laptop, a tablet, or a desktop computer, server, or other computing device. The auxiliary unit 800 may include one or more indicators 812 for providing feedback to the user, such as an alert or status of the auxiliary unit or the camera. For example, the indicators may include a pairing indicator configured to provide an indication of successful pairing, pairing in process, or an indication of an established or active wireless connection (e.g., such as when data is being transmitted to or from the auxiliary unit) or to provide any other type of indication of status (e.g., power level, charging status, data transfer status, etc.). The auxiliary unit 800' on the other hand may include only wireless connectors for communicatively coupling to other computing devices, and may similarly include one or more indicators 812 to provide an indication of status. The auxiliary units 800, 800' may additionally optionally include a display 814, e.g., for displaying status information and/or displaying and/or editing of images (e.g., photos and video).

In some embodiments, e.g., as described with reference to FIGS. 1, 2, and 7, the auxiliary unit may include an internal power source, also referred to as auxiliary power source or auxiliary battery. The auxiliary power source may be a rechargeable battery such as a lithium ion battery. In some embodiments, the auxiliary power source may have capacity which is greater than the capacity of the camera's onboard memory. In some embodiments, the auxiliary unit may include internal memory, also referred to as auxiliary memory, and interface electronics for communication with the camera and/or external computing devices such as a smart phone, a table or other portable electronic device. In some embodiments, the auxiliary unit may include non-volatile memory such as Flash memory, for data storage. In some embodiments, the auxiliary memory may only be volatile memory and the auxiliary unit may be configured only as a pass through device to pass data received to a camera to another computing device for storage without storing the data (e.g., photos and/or video) on the auxiliary unit. In some embodiments, the auxiliary unit may include a controller (e.g., microcontroller unit (MCU)), in which embodiments, the auxiliary unit may be referred to a smart. For example, in examples in which the auxiliary unit is implemented as a case (e.g., which enable the camera to be physically attached such as to be docked or enclosed within the case), a case having a controller may be referred to as smart case. The controller may, in conjunction with memory, provide additional functionality to the camera, such as storage of images, reprogramming of the camera, facilitating communication between the camera and an external computer such as an internet server or a smart phone, and editing or other image processing of images or image data received from the camera.

As described, in some embodiments, the auxiliary unit may be implemented as a case. In some examples, the case can charge a camera via a wired connection. In some examples, the case can charge a camera wirelessly. The case can charge a camera wirelessly when the camera is at least partially enclosed in the case. In some embodiments, the case may be configured to house the camera such that camera is substantially sealed in the case. The case may include a controller (e.g. an MCU) and memory and may be referred to as a smart case. Table 1 shows features of a case according to some examples of the present disclosure.

TABLE 1

Features of a Smart Case for a wearable camera.

| | |
|---|---|
| Dimensions | Less than 150 mm length; less than 250 cc; in some embodiments Less than 100 mm length, less than 75 mm wide and less than 50 mm thick; |
| Weight | Less than 1 lb |
| Data management | WIFI and Bluetooth capability |

TABLE 1-continued

Features of a Smart Case for a wearable camera.

| | |
|---|---|
| and transmission | |
| Data storage | 128 GB Memory or less |
| Data processing | Image processing |
| Power management | Power capacity of up to 5 watts; Energy capacity up to 5 WH; Recharging battery of wearable device; Wireless or hard wired charging of battery in case. |
| User interface | Switching by means of buttons; LED indicators of performance, buzzers, vibrators |

A smart case according to the present disclosure may include a rechargeable battery with a relatively large energy capacity (as compared to the energy capacity of the EWD) and be capable of recharging the battery of the wearable device multiple times, in some cases at least 5 times, before requiring recharge of the case. The smart case may include a memory module that is capable of storing many hundreds of still photographs, and many minutes of audio recordings and videos, received from the wearable device either via wireless transfer or via a wired connection such as a USB port. The smart case may include a microcontroller (MCU) or a microprocessor unit (MPU) that can perform data processing, image processing e.g., for improving the image quality of images (stills or video) received from the camera. The smart case may further include a wireless energy and/or a data transfer system based on either proprietary or standard architecture (e.g., Wi-Fi, Bluetooth, Qi, etc.). The controller (e.g., MCU or MPU) may be configured to monitors charge level of the battery or memory storage (e.g., amount of available storage) in the case and/or the wearable camera and sends alert signals (audio or light) when power level or memory storage level reaches a set threshold or falls below a certain threshold (e.g., below 15%, 10%, or 5% as examples only). When wireless power is provided for powering or charging the case the case can further comprise a coil. It should be pointed out that in certain other embodiments the smart case can charge the camera by way of physical connection such as by way of example only, a micro USB port, or a USB type C port, and not by way of wireless power. The charging would occur when the female micro USB port of the camera is connected to the smart case by way of the male USB port of the smart case.

The case may include a rechargeable battery that may be wirelessly charged from a wireless transmitter. The case may include a rechargeable battery that may be recharged from a wall outlet. The rechargeable battery can have an energy capacity of 5 watt hours or less. The case may include a power management module and a data management module wherein both power and data management modules may reside inside a single microcontroller within the case. The power management module may be configured to monitor power needs of the case and the wearable device, provide an alert and implement a recharging procedure of said device following a protocol that is programmed in a microcontroller comprising said power management module. The data management module may include a memory module that can store data, photographs, audio and video files and is not less than 1 gigabyte in size and can be that of 32 gigabytes or more, wherein data transfer and storage in said memory module is managed by said microcontroller. The microcontroller can have embedded firmware that can perform data processing tasks required for improvement of image quality. The case can transmit data to an APP comprising said remote device. The microcontroller can comprise firmware that reprograms the firmware of the image sensor of the camera module. The firmware can perform image stabilization.

In some embodiments, the camera is equipped with a wireless receiver for receiving power from the smart case. The smart case includes a wireless transmitter for providing power to the camera and to recharge the battery inside the camera. The battery in the camera maybe, by way of example only, a lithium ion, lithium polymer, or a solid-state battery. Wireless power systems may include loosely coupled inductive charging or other techniques as described, for example, in U.S. application Ser. No. 14/969,455, filed Dec. 15, 2015 and published as 2016-0172870, and U.S. application Ser. No. 15/183,368, filed Jun. 15, 2016, and published as 2016-0294225, all of which are incorporated herein by reference in their entirety for any purpose. In certain embodiments the smart case can include a wireless power transmitter capable of providing wireless power to multiple wirelessly coupled electronic devices located within an effective wireless power transfer range of the smart case. One of the electronic devices can be that of a camera.

The camera may include dual band wireless communication to transmit data files (images or video) to an external device, such as the smart case, a smartphone, or to receive commands from an external device, such as by way of example only, a smartphone. Since commands to the camera would require less bandwidth they may be sent to the camera over low power wireless such as Bluetooth or Bluetooth low energy. These commands could include, by way of example only, taking a photo by pushing a button on your smartphone screen form inside an APP that interfaces with the camera by Bluetooth transmission. Bluetooth could also be used for short messaging to the external devices such as the Smart Case or a smartphone, providing system status information. Larger data files transferred from the camera may be done over Wi-Fi to the smart case or directly to another device, such as a smartphone. To preserve power, in some embodiments the Wi-Fi can be operated when the camera is in a proximity to the case or close enough to be well powered by the case so that the power demands for the Wi-Fi transmission do not over load the power supply of the camera. In other embodiments, the Wi-Fi is operated when the camera is located within the case. The wireless communication to the case may also be done with proprietary protocols modulated over the wireless charging signals directly to the smart case. In still other embodiments the smart case can transfer large data files either wirelessly or by a wired connection.

Figure 13:
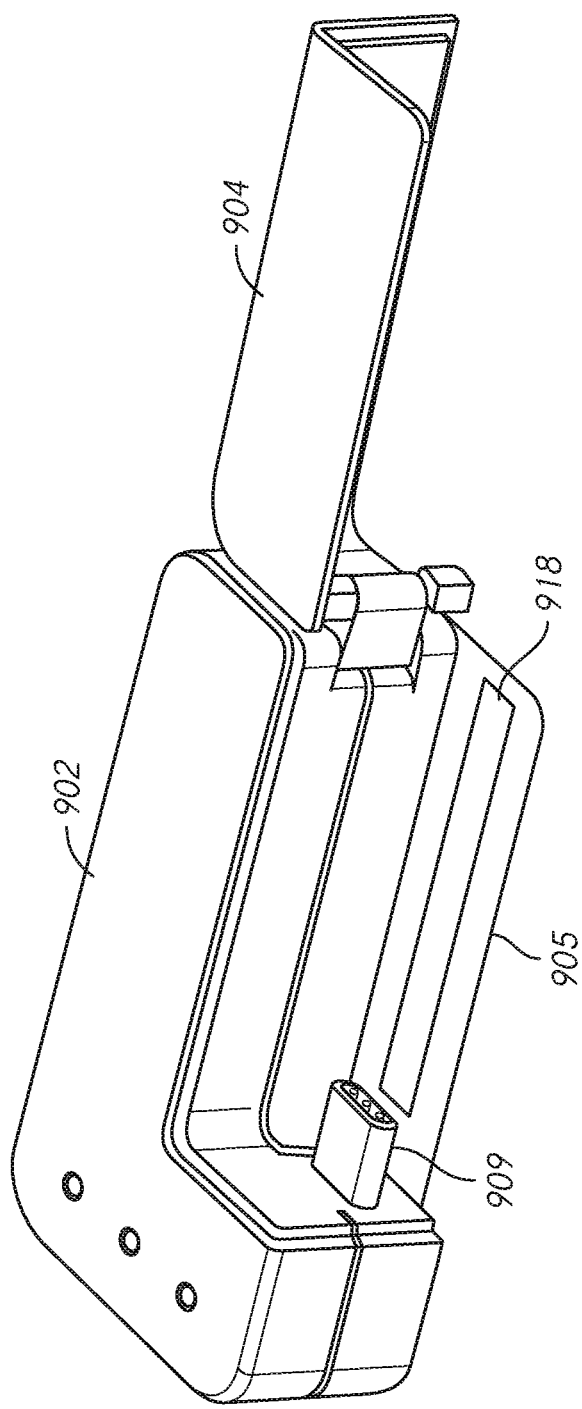
FIG. 13 shows an isometric view of an auxiliary unit implemented as a smart case according to some examples of the present disclosure.

The smart case may also have a track assembly as shown in FIGS. 13 and 14 that help guide the camera into the connector of the smart case to ensure solid mating between the camera and the smart case.

In still other embodiments GPS data may be sent from the camera to the smart case or to a smart phone to help locate the camera if it is lost or misplaced by the user. The case can also be designed to provide alerts. These alerts can inform those within proximity of the case of, by way of example only, general phone calls, important phone calls, important messages and general messages. The case can alert by way of example by, vibration, light, sound.

In another embodiment the smart case can also provide operation support to eyeglasses capable of projecting AR. Typically, AR modules are mounted at or near the head, since they have to project images in the line of sight. In one preferred embodiment, the AR module is mounted on the temple of a pair of eyeglasses, on the inner (closest to head) side, close to the hinges, from which images are projected at the inner surface of the eyeglass lens by means of a light pipe. The AR module is provided with a battery that is relatively small, e.g., less than 10 MAhrs, but can be frequently recharged by placing it in a smart case when not being actively used by the wearer. Similarly, the memory chip in the power and data management system required by the AR module has a battery that is also small, such as less than 4 GB in capacity. In one embodiment, the smart case wirelessly transmits data to the AR module in real time. In a second embodiment, the smart case controls the operation of the AR module wirelessly by transmitting commands in real time. In a third embodiment, the smart case recharges the battery in the AR module through a USB port when the AR module is placed inside the smart case. In a fourth embodiment, the smart case receives data from an APP programmed into a smart phone and feeds such data wirelessly into the AR module in real time, whereas direct data download from an APP to the AR module may present bandwidth problems and prevent seamless streaming of data. The benefit is that the AR module can be made smaller and lighter, and consumes less power since many of the operations of the power and data management system can be performed by the electronics embedded in the smart case. In certain embodiments, the battery is rechargeable and is removable and can be charged in the smart case while the AR module remains on attached on the eyewear and then electrically reconnected to the AR module. In these embodiments the rechargeable battery can be located on the outside side of the temple furthest away from the head of the wearer or on the inside side of the temple closest to the head of the wearer. When an AR module is connected to eyewear it can do so by way of attaching to a non-electrified track such as that of the eyewear temple.

According to some examples, a smart case may be configured to transfer data (e.g., images received from the camera) to any of a variety of external computing devices such as a smart phone (iPhone or Android smart phone), tablet, laptop computer, or in some cases wirelessly directly to the cloud. In some examples, the transfer rate via a USB interface from the smart case may be about 40 Mbytes per second. In some embodiments, the smart case may be configured to transfer data wirelessly. The smart case may be configured to transfer data according to the transfer rates shown in Table 2.

TABLE 2

Typical Data transfer rates from smart case supporting a wearable camera.

| Method/File type | ANDROID | IPHONE |
|---|---|---|
| 1 Meg compressed JPEG | 3 sec | 6 sec |
| 10 second video via BT | 90 sec | 180 sec |

Figure 9:
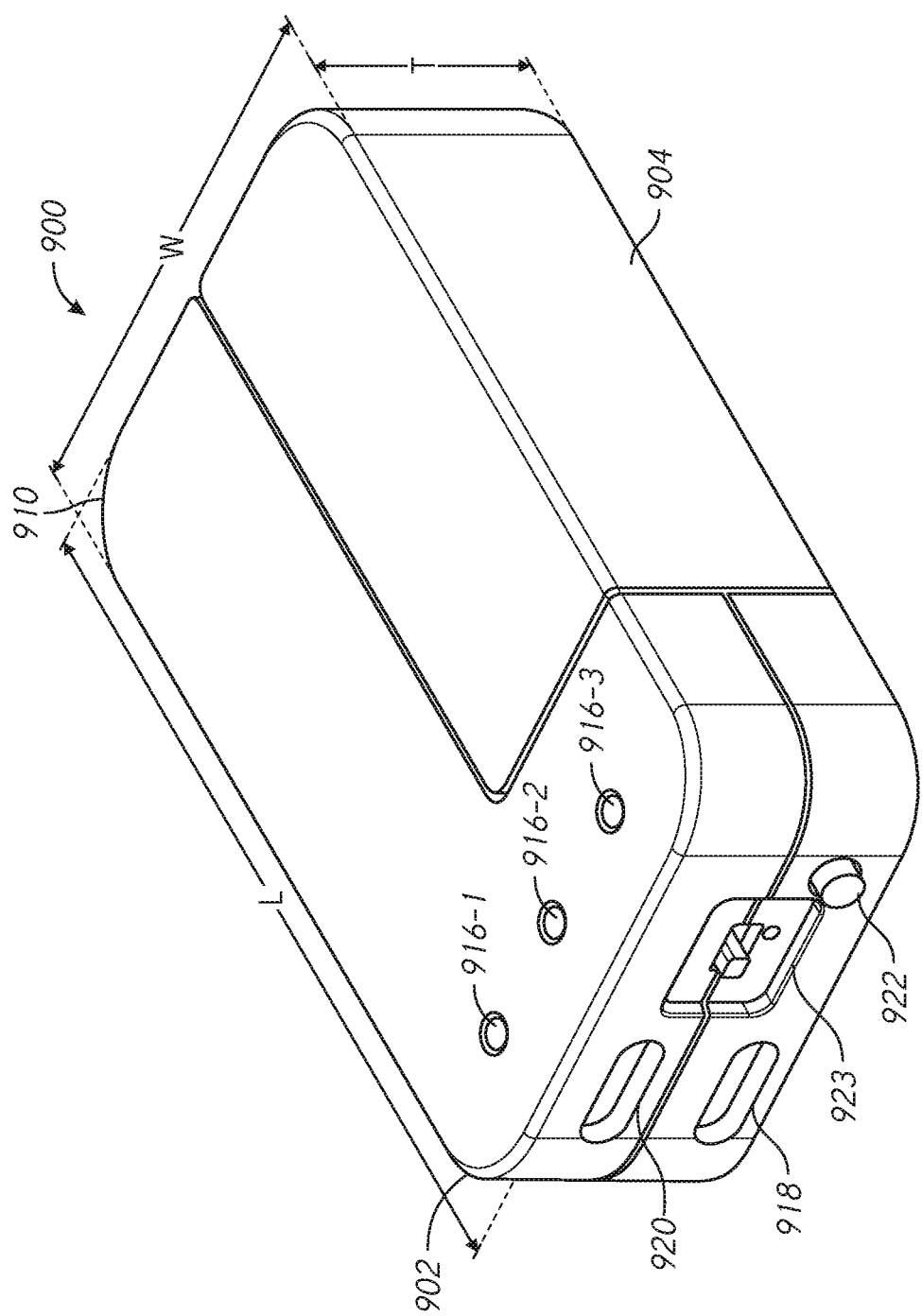
FIG. 9 shows an isometric view of an auxiliary unit implemented as a smart case in accordance with examples of the present disclosure.
Figure 12:
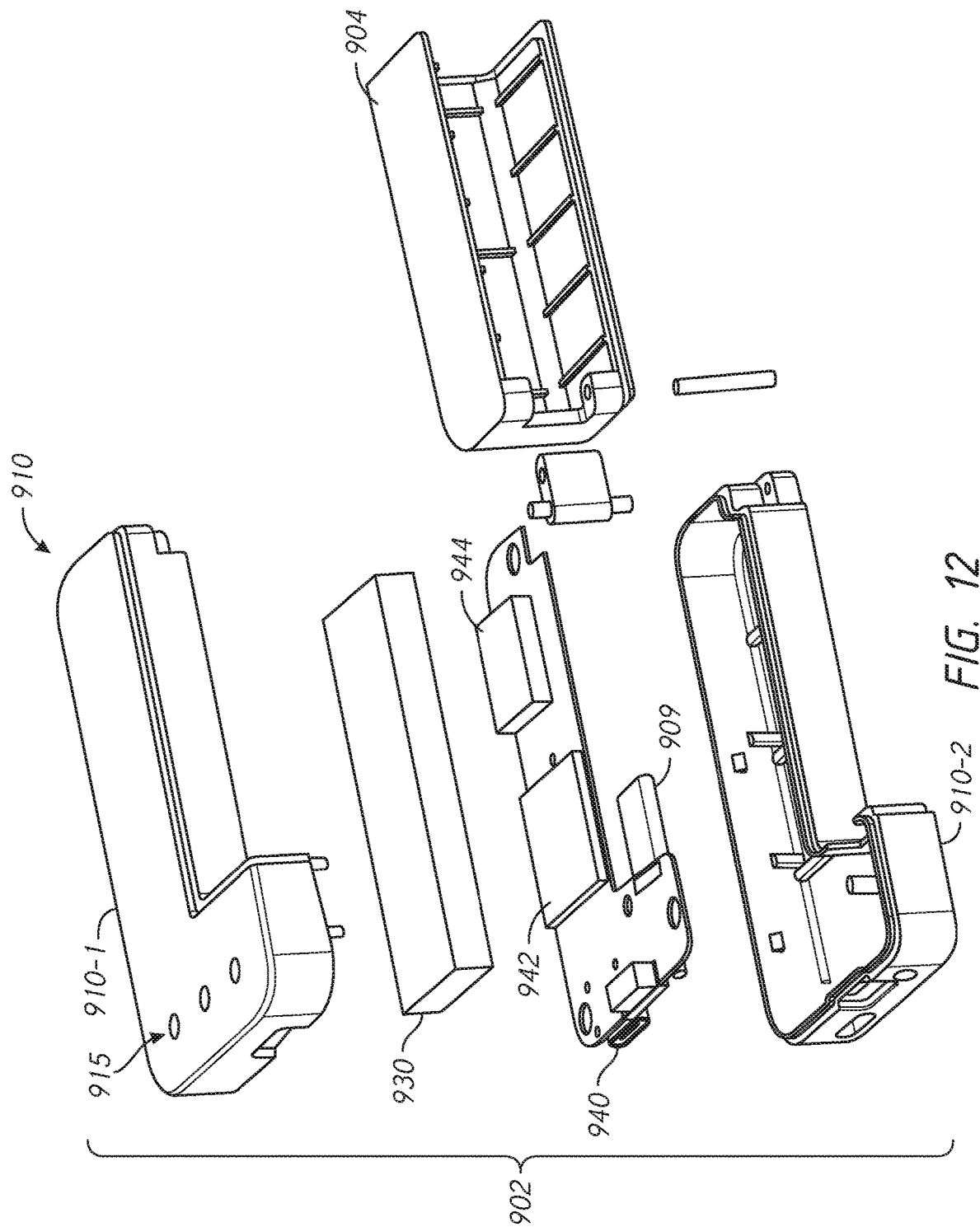
FIG. 12 shows a simplified exploded view of the auxiliary unit of FIG. 10 showing some of the internal components of the auxiliary unit.

FIG. 9 shows an auxiliary unit implemented as a case 900 for an electronic wearable device, e.g., a camera, in accordance with some examples of the present disclosure. The case 900 can include any of the components of auxiliary units described herein. For example, the case 900 may include a power source (e.g., a rechargeable battery 930 as shown in FIG. 12), data storage (e.g., non-volatile memory 944 as shown in FIG. 12), a controller (e.g., MCU 942 as shown FIG. 12), which may be supported by and electrically connected via one or more circuit boards (e.g., PCB 940 or a flex board). In some embodiments, the MCU 942 may be configured to provide power management function, data management function, or both. In some embodiments, the MCU 942 may be configured to process image data received from the camera, e.g., to compress the image data, decompress the image data, encrypt or decrypt image data, or improve image quality of images captured by the camera. The MCU 942 may be configured to process image data further responsive to user inputs, such as to edit (e.g., crop, align, tag, etc.) images captured by the user prior to the images being transmitted externally for storage. In some embodiments, the MCU 942 may be configured to reprogram the image sensor, or any other reprogrammable components of the camera.

In some embodiments, the case may include both wired and wireless interfaces. In some embodiments, one of the interfaces may be used for data communication between the camera and case and the other may be used for power transmission to the camera. For example, a wireless interface may be used to wirelessly charge the camera while data is being communicated to the case via a wired data link. In some embodiments, these may be reversed and power may be transmitted to the camera via a wired link while data is being downloaded from the camera. In yet further embodiments, a wired link may be used for both data and power transfer as between the camera and case while a wireless link is used for external communication (e.g., for power reception by the case and/or data transmission to an external device). In yet further embodiments, this arrangement may be reversed in that communication between the camera and case may be wireless and external communication of the case may be via a wired link. In some examples, any one of the wired or wireless interfaces of the cameras may have multiple uses, for example a wired USB interface may be used for both recharging of the case and for data transfer from the case to an external device. The same or another USB interface (e.g., a micro USB interface) may be used for connecting to the camera. Similarly, any wireless interface (e.g., Wi-Fi module) may be used to communicate wirelessly with the camera and/or an external device (e.g., a smart phone, or the cloud).

In some embodiments, the case's camera interface may be configured to provide data transfer at different rates (e.g. a first relative slower rate and a second relatively faster rate). In some embodiments, the MCU 942 may be configured to activate the faster data transfer rate only when the case is also wirelessly transmitting power to the camera. In some embodiments, the case may have multiple wired interfaces. For example, in the illustrated example, case 900 includes a first wired interface 908, which may be a USB connector 909 (in this case a male micro USB connector) and may function as the camera interface. The case 900 may also include at least one additional wired interface, for example another USB interface 918 (e.g., a female USB connector), an APPLE proprietary LIGHTNING interface 920 (e.g., female LIGHTNING connector), and/or any other type of currently known or later developed connector technology. The case 900 may include internal electronic components configured to enable the case to communicatively couple to an APPLE device (e.g., a device operating on the iOS), an ADROID device, or both. In some embodiments, the external interface may include at least one male connector such as male USB plug, a male LIGHTNING plug, or both, in addition to or alternatively to any male connectors of the camera interface.

In some embodiments, the case 900 may include one or more buttons 922 (e.g., as part of a user interface of the device). The button 922 may be implemented as a mechanical button or a touch sensitive switch and may be operable to receive user input, such as to activate a function of the case, e.g., activate a data link, activate a monitoring/status/ alert function, etc. In some embodiments, the case 900 may include one or more buttons for reconfiguring of the case 900. For example, the case may include an actuator which enables the case to be provided in the open configuration to enable docking of the camera. In one embodiment, the actuator may be a latch release operable to disengage a locking function of the case's door, which may then be openable or may automatically spring open responsive to operation of the latch release. In some embodiments, the case 900 may include an actuator 923 configured to at least partially expose or at least partially conceal an interface connector, e.g., by extending/retracting a male connector, opening/closing a door of a female connector, etc. For example, the actuator may be a mechanical button, which when depressed extends one connector (e.g., a USB or a LIGHTNING connector) from a side of the housing. In some embodiments, the actuator may be configured to extend one connector while concealing another connector of the communication interface (e.g., extends a micro USB connector while concealing the LIGHTNING connector, or vice versa). In some embodiments, the actuator may be implemented as a sliding cover, which is slidable between multiple positions to conceal one or more connectors while exposing another connector. Other variations and combinations of actuators can also be used.

In some embodiments, the capacity of memory 944 may not exceed 1 GByte. In some embodiment, the memory 944 may have capacity of up to 8 GBytes, 10 GBytes or greater. The energy capacity of the battery 930, in some embodiments, may be 5 watt hours or less. In some embodiments, the capacity of the memory 944 may be greater than the capacity of the camera's onboard memory. In some embodiments, the memory 944 may have smaller storage capacity or no storage capacity at all and may instead only pass through images received from the camera to an external device for storage. In some embodiments, the capacity of the battery 930 may be greater than the capacity of the camera's onboard power source. The internal components of the case may be enclosed within a housing, e.g., between upper and lower portions 910-1, 910-2 respectively of the housing 910. The case may include a user interface 915 as will be further described.

In embodiments of case 900, the case may be configured to wirelessly charge the camera 1010 and/or wirelessly recharge its battery 930. The case 900 may include a power transmission coil for wirelessly charging camera 1010. In some embodiments, the MCU 942 may activate the power transmission coil upon detection of a communication link with the camera 1010 (e.g., when the camera 1010 has been detected as plugged into the connector 909 or when the camera has been placed within a charging range of the coil). In some embodiments, the MCU 942 may activate the power transmission coil when the camera is received in the case, which may be detected also via any other type of means (e.g., proximity detection, detection of closing of the movable potion of the housing or door, etc.). In some embodiments, the MCU 942 may be additionally or alternatively configured to activate data transmission from the camera to case 900 when the camera is plugged into or otherwise communicatively connected to the case. As noted, the case 900 may, in some embodiments, be able to be wirelessly recharged. The case may include a power reception coil for receiving power wirelessly from an external power source (e.g., a wireless power base unit). In some embodiments, the power transmission and power reception functions may be performed by the same coil. In some embodiments, the case may include a dual band transmitter/receiver, at least one of the bands being configured, in some embodiments, for wireless power transmission/reception. In some embodiments, at least one of the bands may be used for data transfer.

In some embodiments, the case 900 may have overall dimensions such that the volume of the case does not exceed about 50 cubic cm. In some embodiments, the case's volume may be up to about 250 cubic cm. In other embodiments, the case may be larger than 250 cubic cm. In some embodiments, the case may be shaped as a parallelepiped, however other shapes, regular or irregular, are envisioned (e.g., an oval shape, tubular shape, bean shaped, etc.). The case 900 may be sized to fit into a person's hand, or to be otherwise carried by hand, within a pocket, a purse, or carries elsewhere on the user's person. The case 900 may be up to 70 mm in length (L), or up to 100 mm in length, or up to 150 mm in length. In some embodiments, the case may be up to 45 mm in width (W), or up to 65 mm in width, or up to 85 mm in width. In some embodiments, the case may have an overall length of up to about 120 mm and an overall width of up to about 90 mm. In some embodiments, the case may be up to 20 mm in thickness (T), or up to 35 mm in thickness, or up to 40 mm in thickness. In some embodiments, the case may be portable and its weight may conveniently not exceed 250 grams. In some embodiments, the weight of the case may be up to about 1200 grams.

Figure 10:
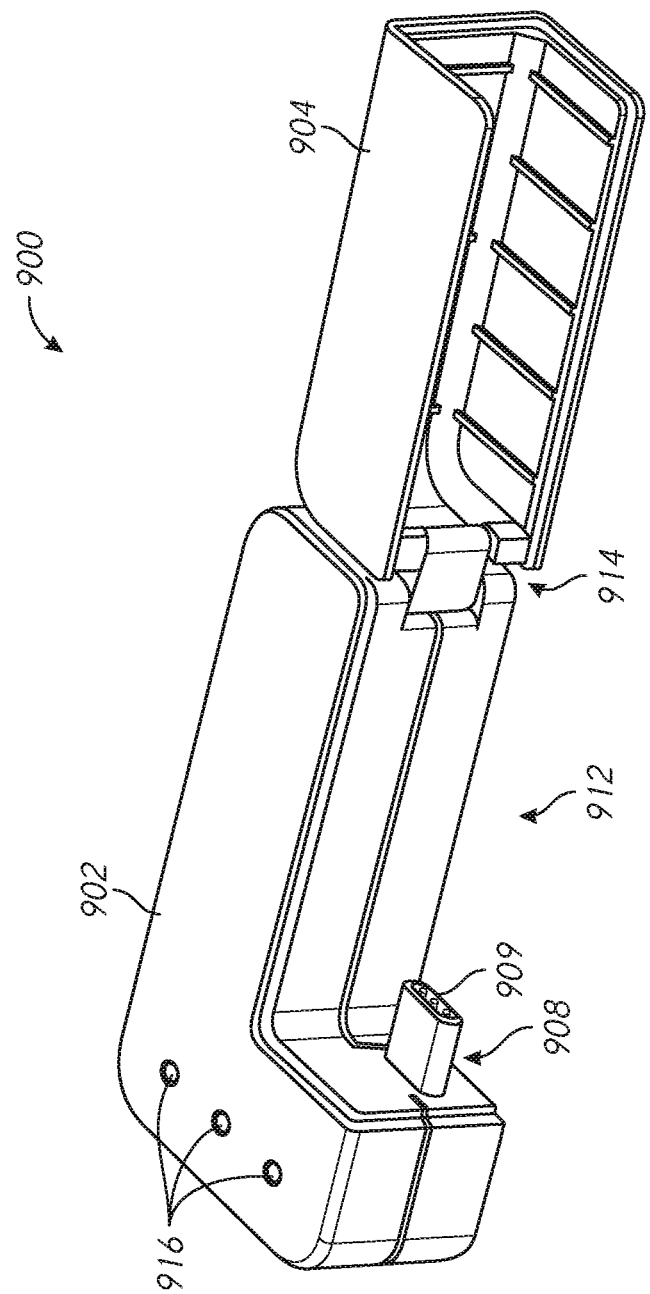
FIG. 10 shows an isometric view of the auxiliary unit of FIG. 9 in an open configuration.
Figure 11A:
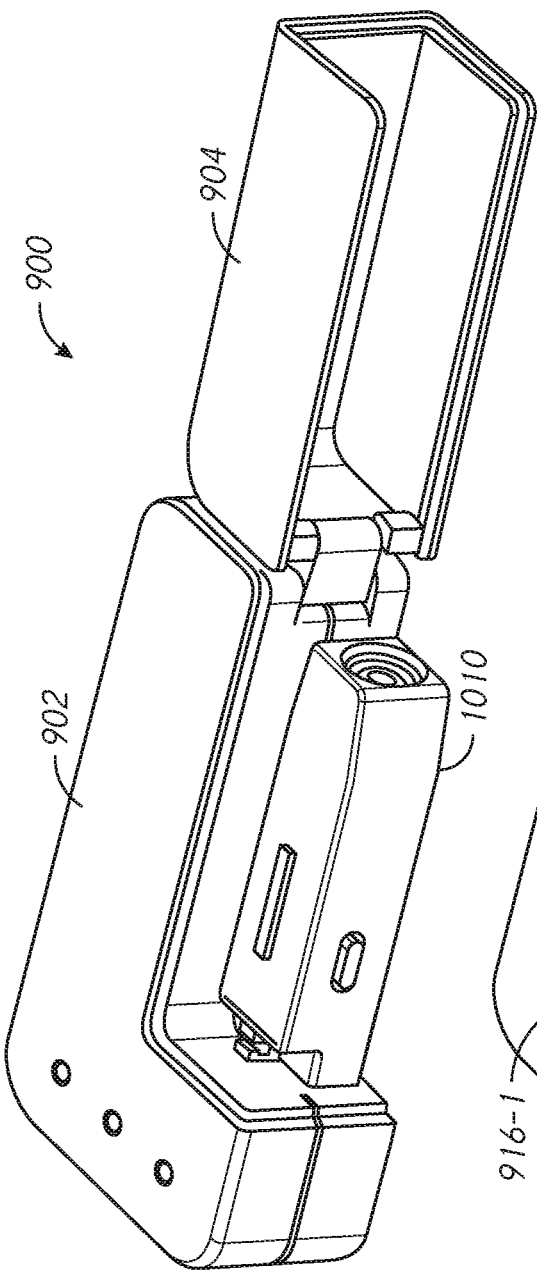
FIGS. 11A and 11B show views of the auxiliary unit of FIG. 10 with a wearable camera docked therein.
Figure 11B:
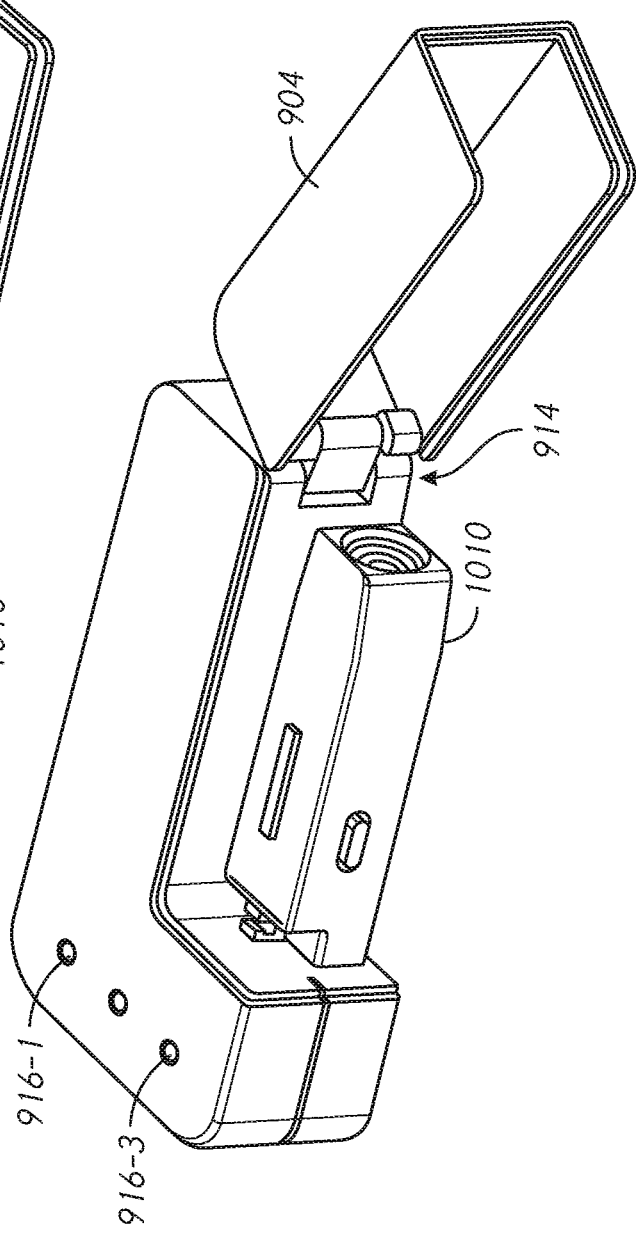

Referring now also to FIGS. 10-12 further features of the case 900 will be described. The case 900 may include at least one configuration in which the case at least partially encloses a wearable camera. In the illustrated example, the case 900 is configured to enclose camera 1010 when the camera is positioned within the docking receptacle 912 and connected to the wired interface 908 of the case (see e.g., FIGS. 10 and 11). The case 900 may include a first portion and a second portion which may be movable in relation to the first portion. The second portion may be configured to be provided in a position which enables the camera to be received in the case 900. For example, the second portion may include a door which is movable relative to the first portion of the case to allow the camera to be placed in the receptacle 912.

The case 900 of this example includes a housing 910, which may be made of any type of a suitable plastic material such as any type of injection moldable plastic material. The housing 910 may enclose some or all of the internal electronic components of the case. In some embodiments, the housing may have a main housing portion 902 and a movable housing portion 904. The main housing portion 902 may enclose some or all of the internal electronic components while the movable housing portion may be movably coupled to the main housing portion to enable the case to be provided in a configuration for insertion of the camera and for at least partially enclosing the camera. In other embodiments, the case may not have a movable housing portion but may instead simply include a docking receptacle configured to receiving the camera at least partially therein. In some embodiments, a movable housing portion may be pivotally coupled to the main housing portion (e.g., via pivot join 914, as shown in FIGS. 10-12). In other embodiments, the movable housing portion may be otherwise movably coupled (e.g., slidably coupled) or removably coupled (e.g., with the movable housing portion being completely detachable and re-attachable to the main housing portion). In some embodiments, the movable or removable housing portion, which may also be referred to as a door or lid, may be magnetically attachable to the body portion. In some embodiments, the case may be water proof. In some embodiments, the case may be water resistant.

Figure 15:
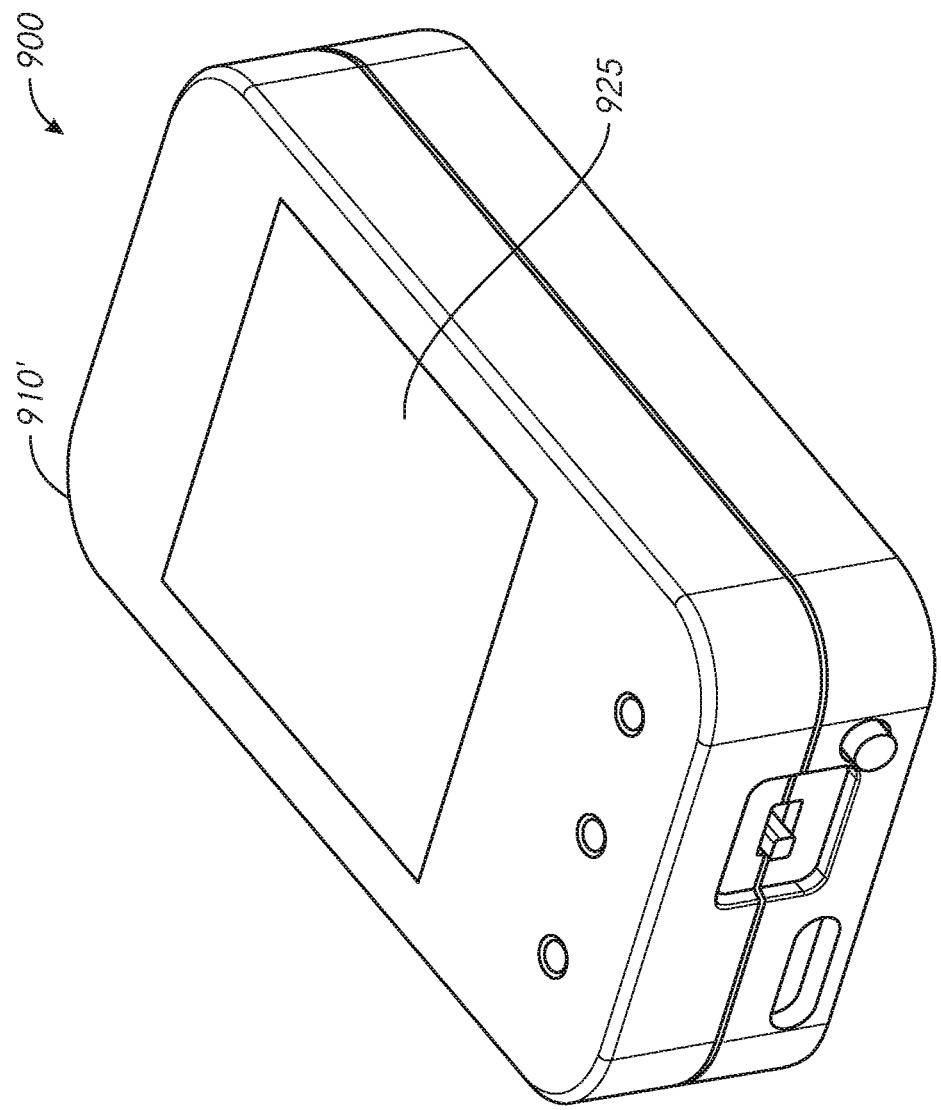
FIG. 15 shows an isometric view of an auxiliary unit implemented as a smart case according to yet further examples of the present disclosure.

The case 900 may include a user interface 915, which may provide user feedback and/or be configured to receive user input. In some embodiments, the case 900 may include one or more indicators 916. For example, the case 900 may include one or more status indicators, for example for indicating power level 916-1 (e.g., of the case, of the camera being docked to the case, or both for example by illuminating a light of a given color to indicate the status of the camera and illumination a different color light to indicate status of the case). In some examples, separate indicators may be used (e.g., indicator 916-1 and 916-3 to indicate the status of the case and camera, respectively. The case may further include a status indicator for indicating a communication function status. For example, the indicator 916-2 may be configured to provide pairing in progress, pairing status, or to provide indication of data transfer activity, e.g., with the indicator illuminating or blinking when data is being transmitted wirelessly from the case to an external device such as a smart phone. The case may include a memory indicator (e.g., to provide an indication of an amount of available memory or amount of available storage used). In some embodiments, the case may include one or more indicators configured to provide an alert or status of the camera (e.g., provide indication of low charge, low memory, outdated programming such as firmware of the camera, etc.) In some embodiments, the case may be configured to provide status of the camera only when the camera is docket to the case. The term docked in the present context would be understood to mean communicatively coupled, which in some examples will mean physically connected e.g., in instances where the case has a wired camera interface. In some embodiments, the user interface may additionally or alternatively include feedback devices configured to provide feedback other than visual feedback, for example audible or tactile feedback. For example, the case 900, in some embodiments, may be configured to produce a sound or activate a vibrator to provide a status or alert. In yet further embodiments, the case 900' may include a display 925 (see e.g., FIG. 15). The display 925 may be implemented using LED, OLED, or other display technology currently known or later developed. The display 925 may be a touch sensitive display. The display 925 may be arranged on an exterior surface of the housing 910' or it may be on an interior surface such that it is at least partially concealed when the case is in a closed configuration. In some embodiments, status or alert function (e.g., as provided at least partially by indicators 916) may additionally or alternatively be provided by the display 925.

As described, the case 900 may be configured to be provided in at least an open configuration (which allows the camera to be received in the case) and a closed configuration (e.g., in the case where the camera is substantially fully enclosed). The case 900 may include a movable portion 904 or door which allows the opening and closing of the case. The door may be hinged and may include one or more hinged portions, or it may be a sliding door. In some cases, it may be fully removable and re-attachable, e.g., via a snap fit connection. The door may protect the camera when stored in the case (i.e., when not in use) and/or may facilitate a better connection with the case (e.g., by applying a pressure on the camera towards the connector 909 when the camera is inserted in the case and the door is closed. The case may be water resistant to an ingress protection rating of 44. In some embodiments, e.g., when the smart case includes a wired external interface such as a USB interface, the case may be provided with a seal at the interface (e.g., a rubber flap covering the USB connector for improving water resistance).

A smart case according to one example includes the product specification listed in Table 3.

TABLE 3

Specifications of an example case for a wearable camera (also referred to herein as "smart case").

| | |
|---|---|
| Dimensions | about 67 mm by about 40 mm by about 18 mm |
| Weight | Less than 250 grams |
| Memory capacity | 8 GB capable of storing about 8000 photos (JPEG) or 45 min of video |
| Processor | MCU STM32F205VGT6 provided by STMicroelectronics or a comparable unit |
| Power ON Indicator | LED |
| Battery run time | 5 recharges of the battery in the wearable camera per charge of the smart case battery lasting about 30 days if not used to charge camera down load 500 still photographs and 10 minutes of video via BT |
| Battery charge time (Not running) | about 60 min for the smart case battery |
| Battery recharge time | about 20 min |
| Battery life | 3 years |
| IR Rating | water resistant to IP 44 |
| Storage Temperature range | about −20 C. to about 45 C. |
| Use temperature range | about 0 C. to about 45 C. |
| Battery type | Secondary Li ion |
| Display (optional) | OLED or LED |

Additionally, the smart case may include electronic components as listed below:

| Components | Details |
|---|---|
| Bluetooth module | ST SPBT3.0DP2 provided by ST Microelectronics or a comparable Bluetooth module |
| Memory | microSD card holder with 8 GB microSD card |
| ULPI high-speed USB chip | Microchip USB3300-EZK-TR |
| Power management components | LDO, buck-boost, boost (see BOM for details) |
| Battery 250 mAh/ 220 mAh | Renata ICP521630/Fullriver 451248 |
| Apple | MFI authentication co-processor 2.0 C |

In some embodiments, the Bluetooth interface of a case according to the present disclosure may be configured to support one or more of the following services: File Transfer Profile (FTP), Serial Port Profile (SPP), iPod Accessory Protocol 2 (iAP2), or any combination thereof. The Bluetooth interface may be configured to support any other Bluetooth service as may be desired. In some embodiments, the Bluetooth interface may be configured to support Apple MFI iAP2 over I2C interface to an Apple MFI authentication coprocessor.

In some embodiments, the controller (e.g., MCU) of the case may include custom firmware configured to perform image processing and/or image enhancement. For example, the ISP of the camera module of the wearable camera may be programmed to execute a specific image integration time, e.g., 20 milliseconds. A shorter image integration time reduces image blur due to camera movement, but reduces image clarity in low light environments. In some embodiments, the MCU of the case may be configured to set the image integration time depending on ambient light level of the environment. The MCU of the case may comprise firmware that can perform subpixel processing in order to further improve image contrast, add low or high band pass filters and add Gaussian blur to further improve image quality. The reprogramming of the ISP of the camera module adds an important capability to the camera, for example, image processing features such as color balancing may be improved in this manner. Furthermore, the firmware in the MCU of the case may be also used to add new features such as control of a focusing element, an electronically controlled aperture, image stabilization algorithms, and so on. The case may be configured to communicate with a mobile computing device, e.g., a smart phone, through an APP installed on the smart phone. In some embodiments, the APP on the smartphone may indicate usable battery level and memory level of the camera and the smart case.

Figure 14A:
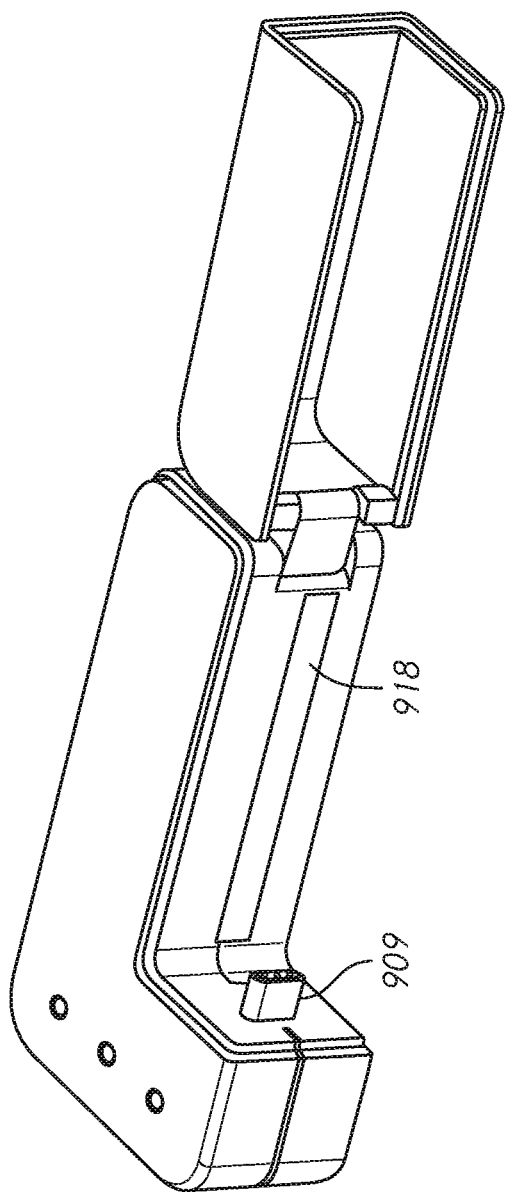
FIGS. 14A and 14B show isometric views of an auxiliary unit implemented as a smart case according to further examples of the present disclosure.
Figure 14B:
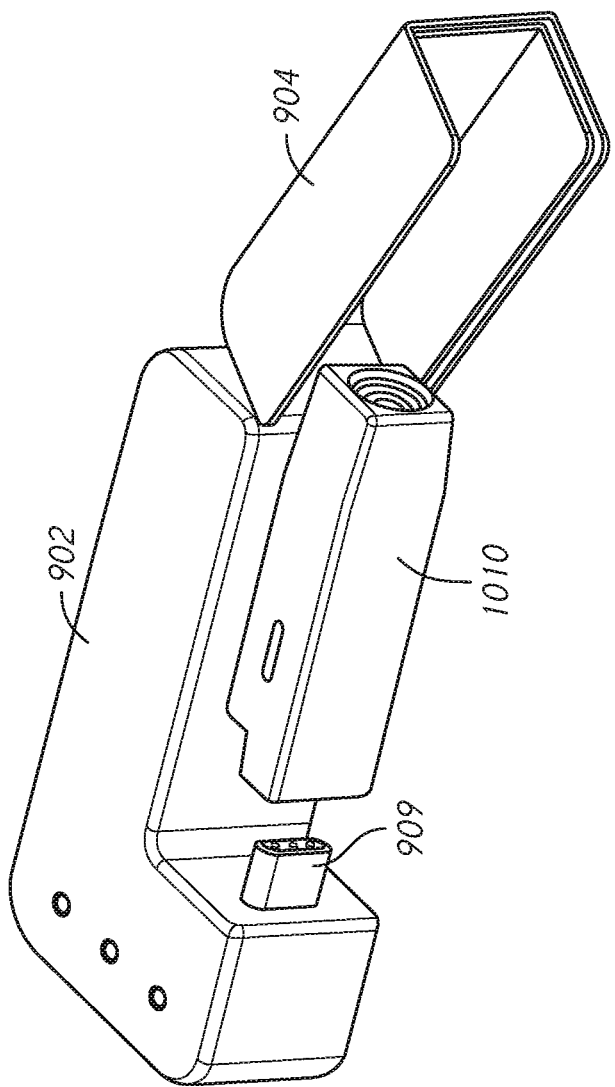

In some embodiments, the case may include a built-in track to align and secure the camera when placed in the case. For example, FIGS. 13 and 14 show examples of s smart case including a track. The track may be provided, e.g., in examples having a wired camera interface, along a surface of the case which is generally parallel with a major surface of a male plug, that is the surface of the largest side of the plug. In the example in FIG. 13, the plug is oriented such that the major surfaces of the plug are generally parallel with the major surfaces of the case. The track is therefore disposed along a surface which is also generally parallel with the major surfaces of the case, for example, the track may be provided on a lower interior surface or an upper interior surface of the docking receptacle. In the example in FIGS. 14A and 14B, the plug has been rotated by 90 degrees such that the major surfaces (e.g., the wider dimension) of the plug is generally perpendicular to the major surfaces of the case. In this example, the track may be provided on a surface that is generally perpendicular to the major surfaces of the case. These example assume a configuration of the camera as illustrated in FIGS. 5A-5C, that is, an embodiment in which that the attachment member of the camera 1010 for securing the camera to the eyewear is arranged on a surface parallel to the widest dimension of the opening of the female connector of the camera. In other embodiments, the attachment member of the camera and/or connector may be differently arranged relative to the camera connector thus driving a different arrangement of the track of the case. As will be appreciated, in embodiments in which the case is provided with a track, the attachment member of the camera may thus provide a dual functionality for 1) attaching the camera to the wearable article (e.g., eyewear) and 2) aligning and securing the camera relative to the case. In addition, interior dimensions of the docking receptacle may be such that closing of the case after receiving the camera therein further secures the camera and ensure engagement of the camera female connector to the male connector of the case, such as by pressing against the side of the camera opposite the connector when the camera is inside the case and the case has been provided in the closed configuration. The track of the case may not be magnetic and still provide alignment and a securing function in combination with the connector plug to which the camera is plugged when docked in the case. In other embodiments, the track of the case may be a magnetic track similar to a track of eyewear to which an example camera is designed to attach.

The case can be configured to monitor the status of the case and/or the camera when coupled thereto. For example, the case can monitor the charge of the camera and/or of the case, available storage onboard the camera and/or the case, pairing status, data transfer status, etc. The case may be configured to provide an indication of status. The case may provide an alert, for example a vibration, a sound, or a light. The alert may be an indication of a status being monitored.

In some embodiments the case 1410 may include a display 1412, e.g., as shown in FIG. 14. The display can be that of, by way of example only, an OLED display, LED display. The case (e.g., case 1410) can include software which allows the user to perform auto-centering, auto-rotation, auto-alignment, auto-cropping and image enhancement on images captured by the camera. The display 1412 may be a touch display that allows the user to manipulate, rotate, crop, enhance, or otherwise edit the image prior to storing it on the smart case memory or prior to sending it to the cloud or to a website such as Facebook, Instagram, Snapchat or other social media site.

Figure 16:
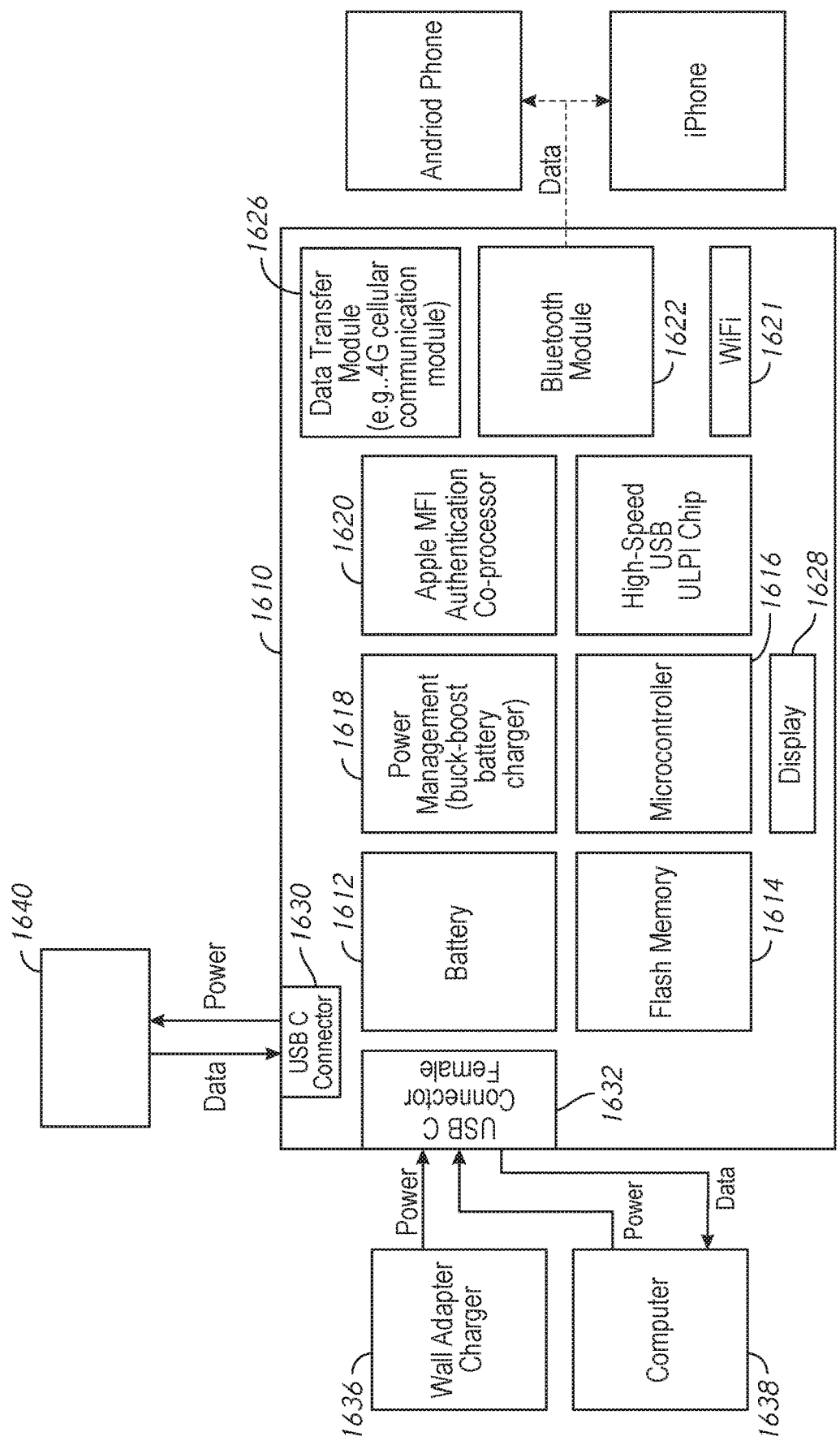
FIG. 16 shows a block diagram of electronics architecture of an auxiliary unit in accordance with some examples herein.

FIG. 16 shows a functional block diagram of a smart case in accordance with examples of the present disclosure. The smart case 1610 includes a battery 1612, memory 1614, microcontroller 1616, power management circuitry 1618, an authentication processor 1620, multiple wireless interfaces (e.g., a Bluetooth module 1622, Wi-Fi module 1624, and a wireless data transfer module 1626 such as a 4G cellular communication module or other), a user interface including a display 1628 and one or more indicators (not shown), and multiple wired interfaces (e.g., a USB C male connector 1630 such as for coupling the smart case to a wearable camera 1640, and a USB C female connector 1632 such as for coupling the smart case to an external power source such as a wall adapter charger 1636 or to a laptop computer 1638). The smart case 1610 may include additional components from any of the auxiliary units described herein or may have fewer components than those illustrated in other embodiments.

Figure 17:
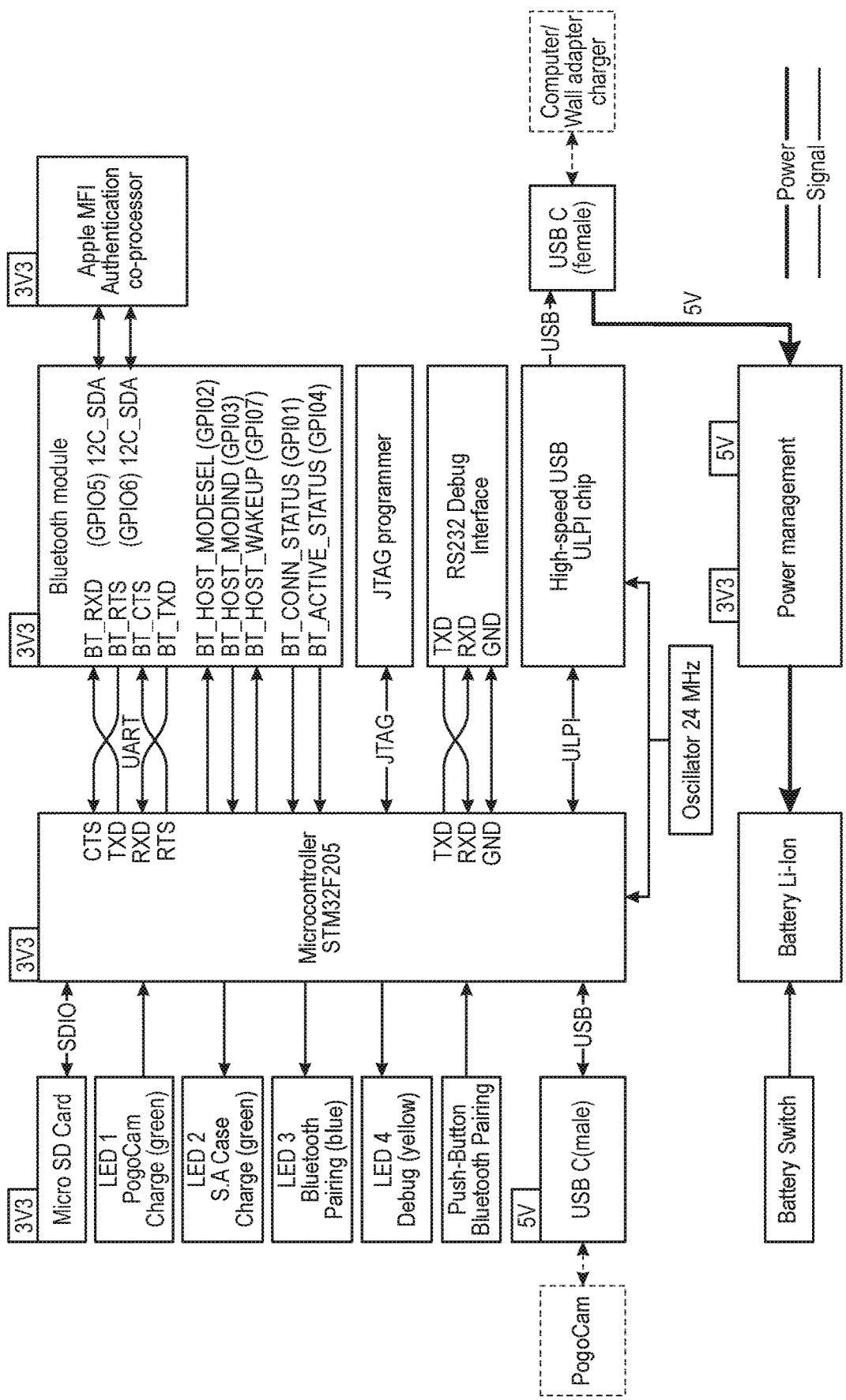
FIG. 17 shows another block diagram of electronics architecture of an auxiliary unit in accordance with some examples herein.

FIG. 17 illustrates a diagram of electronics architecture of an auxiliary unit in accordance with at least one example of the present disclosure. The electronics architecture in FIG. 17 may be used to implement some components of the auxiliary unit, for example, an MCU, Bluetooth module, and other components of the auxiliary unit, such as components shown in FIG. 16. As shown in FIG. 17, the MCU of an auxiliary unit may be coupled to a BT module which, in this embodiment, includes necessary functionality to interface directly with a MFi authentication chip. In this manner, no connections may be required between the MFi authentication chip and the MCU. The MCU is further configured to control the various user interface features of the LED bank and the data transfer to the memory card, as well as the USB interface for data transfer between the case an external computing device.

Figure 18:
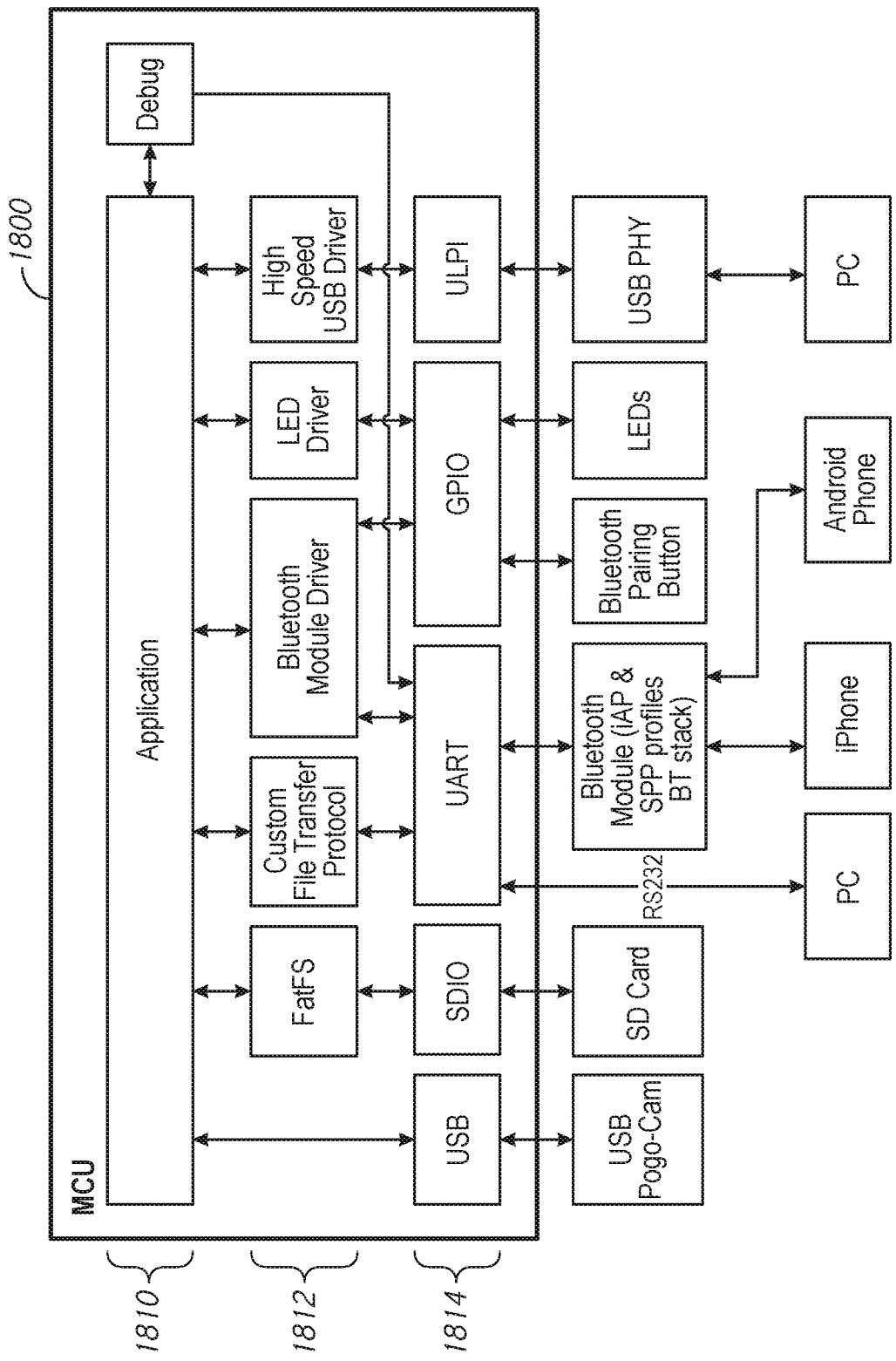
FIG. 18 shows a block diagram of controller architecture of an auxiliary unit in accordance with some examples of the present disclosure.

FIG. 18 shows a block diagram of an example firmware architecture for a microcontroller of a smart case according to the present disclosure. The microcontroller 1800 may include an application layer 1810, a middleware and drivers/support layer 1812, and a hardware layer 1814. The arrangement of components shown in FIG. 18 is exemplary only and other combinations including adding, removing or rearrangement components are envisions.

Figure 19A:
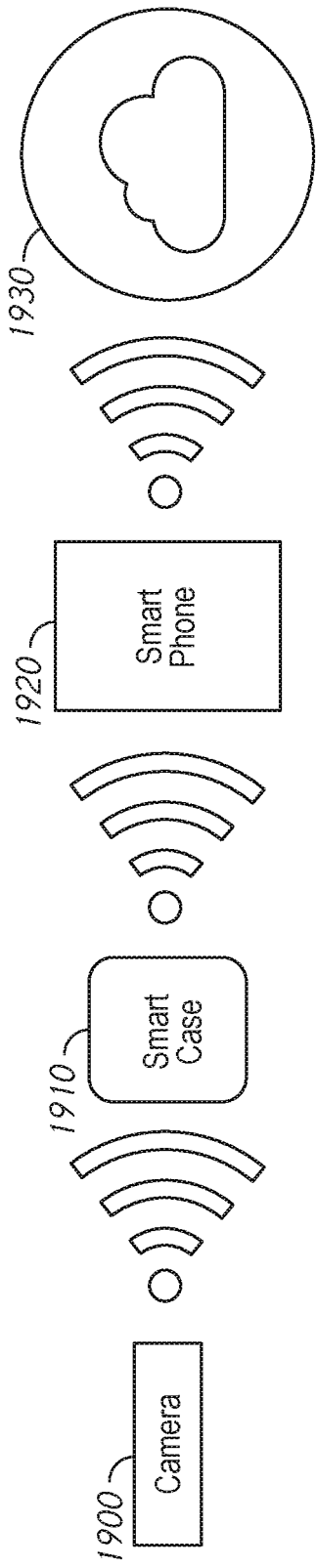
FIGS. 19A and 19B shows operational environments for cameras and auxiliary units according to some examples of the present disclosure.
Figure 19B:
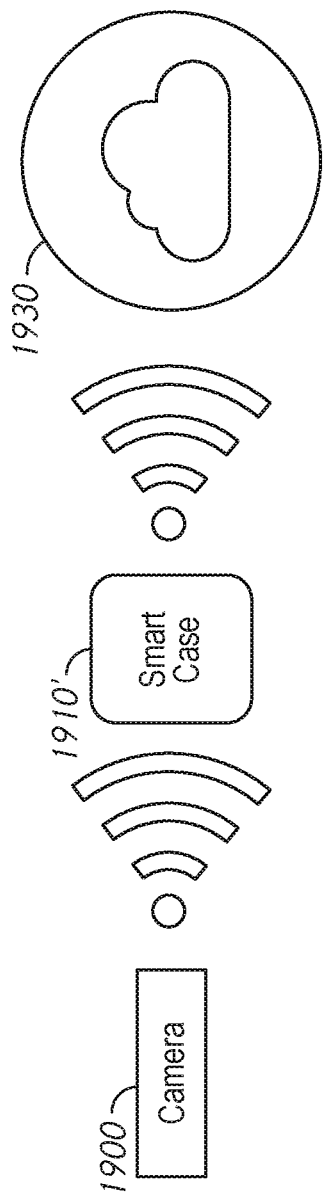

In some embodiments the auxiliary unit (e.g., smart case) may include wireless communication link configured to connect directly to the internet, e.g., as shown in FIG. 19B, such that files from the auxiliary unit can be transmitted directly to one's e-mail account, social media account, or to cloud based storage. The auxiliary unit can also include geolocation (such as GPS) and time/date indication which can be added to images captured by the wearable camera. FIG. 19B shows an operational scenario in which a wearable camera 1900 transmits data wirelessly (or in some cases via wired connection) to a smart case 1910' (e.g., when docked therein or when in operation range of the wireless receiver and in accordance with data transfer protocols provided in the smart case and/or camera), and the smart case 1910' wirelessly transmits data received from the camera directly to an internet server 1930, e.g., for storage on the cloud or upload to a social media site, without requiring the smart case to be connected to any other intermediate computing devices. In FIG. 19A, the operational scenario includes a wearable camera 1900 which transmits data wirelessly (or in some cases via wired connection) to a smart case 1910 (e.g., when docked therein or when in operation range of the wireless receiver and in accordance with data transfer protocols provided in the smart case and/or camera), and the smart case 1910 transmits data received from the camera wirelessly (or in some cases via a wired connection) to a portable computing device (e.g., a smart phone 1920), which can then transmit the data to an internet server 1930, e.g., for cloud storage or upload to a social media site.

Figure 20:
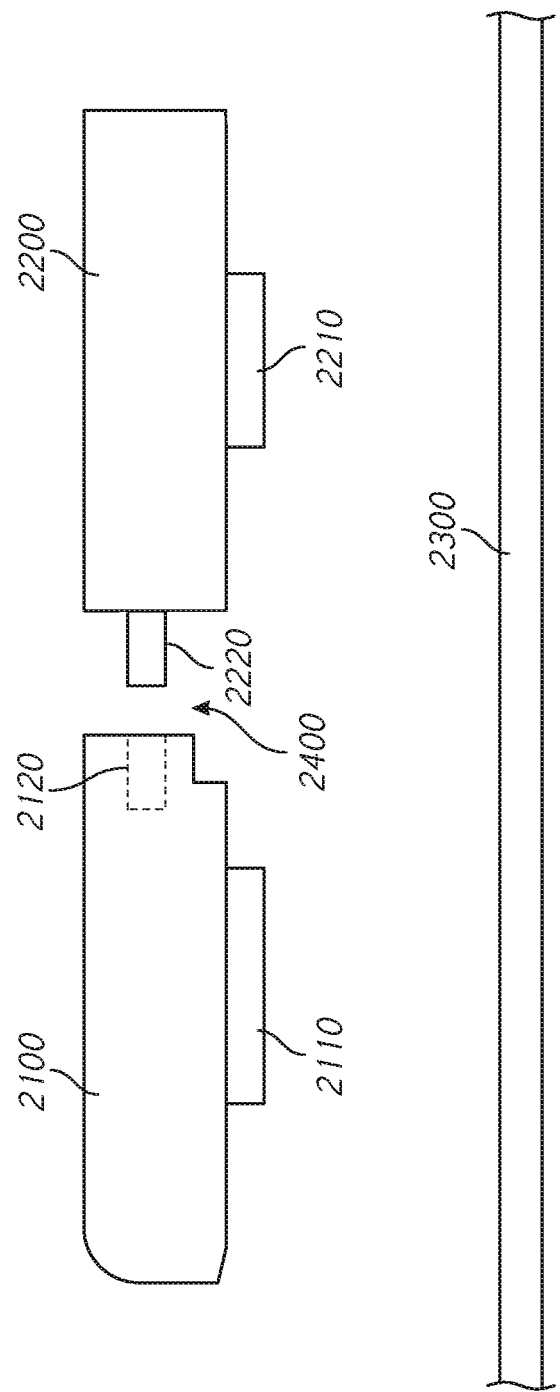
FIG. 20 shows an example system including a wearable electronic device and an auxiliary unit which are attachable to a common platform as a single unit in accordance with examples of the present disclosure.

Further examples of auxiliary units configured for connection with the wearable device to a common platform are described with further reference to FIGS. 20-21. In some embodiments, the auxiliary unit may be configured to connect as an extension to an electronic wearable device (e.g., a wearable camera) such that the auxiliary unit and the EWD together form a wearable device which can connect to a common platform (e.g., a wearable article such as eyewear). The wearable camera may be any camera designed to worn on the body or on an article worn on the body, by way of example only, an eyewear frame. For example, a wearable camera may be a camera having a sufficiently small form factor to be able to attach the camera to eyewear, such as by attaching it to a side of the temple. Although example of auxiliary unit thus connectable to a EWD is described primarily in connection with wearable cameras, it will be understood that the EWD may be any other type of EWD other than camera such as, by way of example only, an image display system, an air quality sensor, a UV/HEV sensor, a pedometer, a night light, a blue tooth enabled communication device such as blue tooth headset, a hearing aid or an audio system. In some examples, the electronic device may be worn elsewhere on the body, for example around the wrist (e.g., an electronic watch or a biometric device, such as a pedometer). The electronic device 200 may be another type of electronic device other than the specific examples illustrated. The electronic device 200 may be virtually any miniaturized electronic device, for example and without limitation a camera, image capture device, IR camera, still camera, video camera, image sensor, repeater, resonator, sensor, sound amplifier, directional microphone, eyewear supporting an electronic component, spectrometer, directional microphone, microphone, camera system, infrared vision system, night vision aid, night light, illumination system, sensor, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, CO sensor, CO detector, CO2 sensor, CO2 detector, air particulate sensor, air particulate meter, UV sensor, UV meter, IR sensor IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, speaker, acoustic amplification device, acoustic canceling device, hearing aid, assisted hearing assisted device, informational earbuds, smart earbuds, smart ear-wearables, video playback device, video recorder device, image sensor, fall detector, alertness sensor, alertness monitor, information alert monitor, health sensor, health monitor, fitness sensor, fitness monitor, physiology sensor, physiology monitor, mood sensor, mood monitor, stress monitor, pedometer, motion detector, geo-location, pulse detection, wireless communication device, gaming device, eyewear comprising an electronic component, augmented reality system, virtual reality system, eye tracking device, pupil sensor, pupil monitor, automated reminder, light, alarm, cell phone device, phone, mobile communication device, poor air quality alert device, sleep detector, doziness detector, alcohol detector, thermometer, refractive error measurement device, wave front measurement device, aberrometer, GPS system, smoke detector, pill reminder, speaker, kinetic energy source, microphone, projector, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, kinetic energy source, thermo electric power source, smart band, smart watch, smart earring, smart necklace, smart clothing, smart belt, smart ring, smart bra, smart shoes, smart footwear, smart gloves, smart hat, smart headwear, smart eyewear, and other such smart devices. In some examples, the electronic wearable device may be a smart device.

The auxiliary unit may be configured to attach to the camera through any physical connection between the auxiliary unit and camera. The physical connection may in some examples also provide an electrical connection between the camera and auxiliary unit. In some examples, the physical connection may be operatively associated with a wired camera interface to enable communicatively coupling the camera to the auxiliary unit. In some embodiments, the physical connection between the wearable camera and an auxiliary unit may provide at least two electrical connection points between the wearable camera and the auxiliary unit. The auxiliary unit may be configured to function as an extension power source, which when combined with the onboard power source of the camera forms a composite power source. In other words, the term composite power source may be used to refer to any source of power for a EWD (e.g., a wearable camera) that includes the internal power supply of the EWD and at least one external source, such as an external source that resided inside an attachable auxiliary unit designed to connect with the EWD through a connection means. In some embodiments, the physical connection provides no electrical connection points and any communication between the auxiliary unit and the EWD is wireless.

FIG. 20 illustrates an auxiliary unit 2200 attachable to and detachable from a wearable camera 2100. The camera 2100 may be implemented according to any of the examples of cameras described herein. The camera 2100 includes an attachment member 2110 for removably attaching the camera 2100 to a platform 2300, for example an eyewear frame or more specifically a temple of an eyewear frame.

The camera 2100 and auxiliary unit 2200 are associated with an attachment system 2400. The attachment system 2400 may be configured to enable the camera 2100 and auxiliary unit 2200 to be physically joined to one another to become a single unit attachable and detachable as a unit from the platform. For example, the camera 2100 may include a first connection portion 2120 and the auxiliary unit may include a second connection portion 2220 designed for cooperating fit with the first connection portion 2120. In some examples, the first connection portion 2120 and the second connection portion 2220 may provide a wired electrical interface between the auxiliary unit 2200 and the camera 2100. In some examples, the first connection portion 2120 and the second connection portion 2120 may provide a rigid connection between the camera 2100 and auxiliary unit 2200 such that movement of the camera 2100 causes movement of the auxiliary unit 2200 and vice versa. In other embodiments, the connection may be flexible.

In some embodiments, the connection portion 2120 may include a female standard connector, such as a female USB connector. The second connection portion 2210 may include a male standard connector, such as a male USB connector. The term USB connector is meant to include any type of USB connector including micro USB connectors. In some embodiments, the connection portions 2120 and 2220 may include flexible connectors. In some embodiments, the camera and auxiliary unit may connect mechanically, magnetically, or otherwise to one another without the physical connection providing electrical contact points.

The auxiliary unit 2200 may be implemented according to any of the examples herein. In some embodiments, the auxiliary unit 2200 may include an attachment member 2210 which is configured to removably attach the auxiliary unit 2200 to the platform 2300. In some embodiments, the auxiliary unit 2200 may not include the attachment member 2210 but may instead be considered to be attached to the platform 2300 (e.g., eyewear temple) via a rigid link between the auxiliary unit 2200 and camera 2100 and via the camera's connection to the platform 2300. In some embodiments, the camera 2100 and/or the auxiliary unit 2200 may be attachable to the common platform 2300 via magnetic means. In some examples, the platform 2300 may be a track that includes a ferromagnetic material (e.g., a magnet, a magnetic metal material, etc.), an eyewear temple including a ferromagnetic material, of a universal connector that is attachable and detachable to an eyewear temple wherein the universal connector includes a ferromagnetic material.

As described, the attachment member 2110, and optionally attachment member 2220, may include one or more magnets which can attract to a metallic component of the common platform 2300 (e.g., a metallic surface, a metallic insert, or any implementation of a metallic track). In some embodiments, the arrangement may be reversed in that the attachment members 2110 and 2220 may include a magnetic metallic material which is attractable by a magnetic material of the common platform 2300. In other embodiments, the attachment mechanisms as between the attachment member 2110, and optionally attachment member 2220, and the platform 2300 maybe purely mechanical in nature, such as a simple post into a slot arrangement. In still other embodiments, the common platform 2300, resides inside one or both temples of an eyewear frame.

In an embodiment, the auxiliary unit 2100 may include a housing, a camera connector (e.g., a USB connector) and one or more electronic components at least partially enclosed within the housing. The camera connector may include at least two electrical contacts. The one or more electronic components may include a power source, optionally a memory device, and an interface for communicatively coupling the auxiliary unit to the camera. The one or more electronic components may be operatively connected to the at least two electrical contacts for communicatively coupling the auxiliary unit to the camera. In some embodiments, the auxiliary unit 2100 may include an attachment member connected to or integral with the housing, wherein the attachment member is configured as an extension of the camera attachment member to enable the wearable camera and the auxiliary unit to be connected together to a common platform.

FIGS. 21A-D show auxiliary units 2200-*a* through 2200-*d* according to further examples of the present disclosure. Each of the illustrated auxiliary units 2200-*a* through 2200-*d* are shown configured with a USB plug 2222*a*-*d*; however it will be understood that an interface other than a USB interface may be used in other embodiments of the present disclosure.

In some embodiments, the auxiliary unit may include only a battery for extending the useful life of the camera. In some embodiments, the auxiliary unit may include multiple batteries. In embodiment, the battery connection between the wearable camera and the auxiliary unit may be via a parallel connection, such that the voltage of the combined batteries is the same. In some embodiments, the battery or batteries in the auxiliary unit may be a near exact match to the internal battery of the wearable camera to optimize the combined performance of the composite power source. A battery of the auxiliary unit may be rechargeable and the auxiliary unit may include battery charging circuit connected to an external communication interface (e.g., another USB interface, such as a female USB connector) for coupling the auxiliary unit to an external power source. For example, as shown in FIG. 21A, the auxiliary unit 2200-*a* includes only a battery 2230-*a* (or multiple batteries) and any accompanying circuitry, such as for recharging the battery 2230-*a* including another connector 2260-*a* for plugging into an external charger. As such the auxiliary unit 2200-*a* can function as a battery extension or wearable battery pack for the wearable camera 2100.

Figures 21C, 21D:
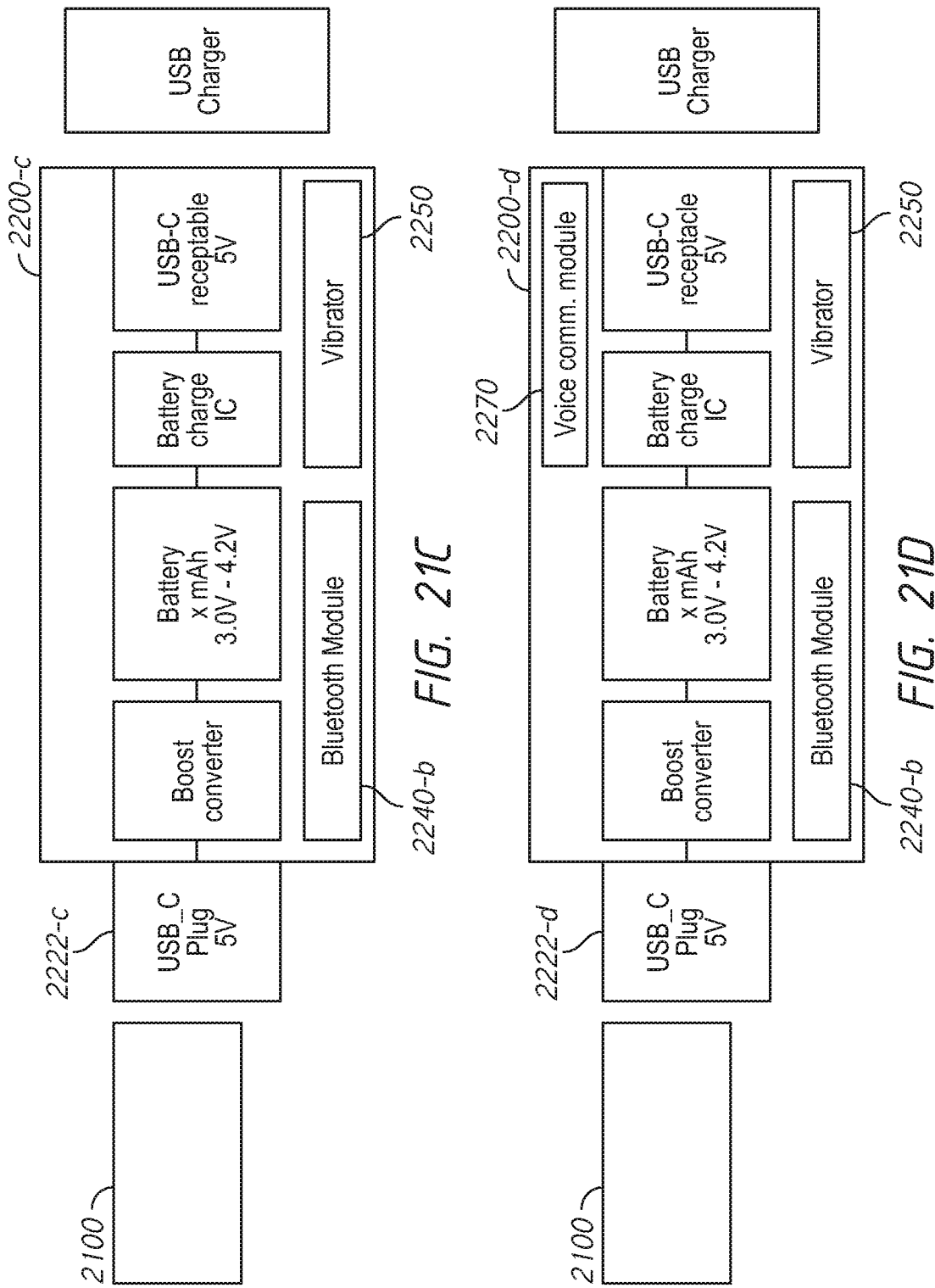

In other embodiments, the auxiliary unit may also include electronic functions, such as a wireless module for wireless communication. Wireless communication devices may include Bluetooth, Wi-Fi, or any other wireless technologies currently known or later developed. For example, as shown in FIGS. 21B-D, the auxiliary units 2200-*b* through 2200-*d* include not only a battery (as a battery extension to the camera onboard power source) but also a wireless communication module (e.g., 2240-*a* and 2240-*b*, which may be Wi-Fi, Bluetooth or other type). In some embodiments, the attachable accessory may also include electronic storage or Flash Memory. In most, but not all, embodiments, the auxiliary unit will include its own power source that is share with the wearable camera and used to power additional functionality present in the auxiliary unit. In other embodiments, the battery inside the wearable camera may provide the power to operate the electronics inside the auxiliary unit.

In embodiments where the electronic interface between the camera and auxiliary unit is a USB connection, the wearable camera may include charging and power management electronics that will require the external power source to act like a standard 5V USB charging port. In this case, the attachable accessory may include a power boost circuit as illustrated in FIGS. 21A-21D, which may be configured to drive the power charging circuit inside the wearable camera. Also in such embodiments, the battery inside the auxiliary unit may include its own power charging circuit as well as a USB female connector to be charge from an outside charging source, such as, a wall adaptor with 5V DC or other 5V USB source, such as a PC, notebook, or laptop computer.

In still other embodiments, the auxiliary unit may include additional electronic functions that enhance the performance of the wearable camera.

In some embodiments, as shown in FIG. 21B, the auxiliary unit may include features like a buzzer or vibrator 2250 that could provide feedback, such as an alert or status indication, to user of the wearable camera that would normally be provided by the internal audio source inside the camera. In this manner the alert function that may otherwise be provided by the camera may be offloaded to the auxiliary unit. As described herein, various functions that may otherwise be typically provided by the camera, such as wireless communication means for example Bluetooth or Wi-Fi, could be offloaded to the auxiliary unit thus reducing the side of the camera and the auxiliary unit being detachable when not in use.

As further shown in FIG. 21D, the auxiliary unit 2200-d may include additional functionality such as a voice communication module 2270. The voice communication module may be configured to provide functionality similar to, for example, those found in Apple's SIRI, Amazon's Alexa, Microsoft Kinect or other voice recognition technologies. The voice communication module may enable the wearer of the camera and the auxiliary unit to control the camera and get status information from the camera using voice commands or queries. In some embodiments, the auxiliary unit (e.g., auxiliary unit 2200-d) may include a microphone and a speaker which may be operatively associated with the voice communication module, if present.

Further inventive examples are described in the following enumerated paragraphs.

A1. A camera system comprising:
a wearable camera comprising a memory configured to store photos or video captured with the wearable camera and comprising a camera controller and an onboard battery having onboard power capacity; and
an auxiliary unit comprising:
an auxiliary battery having auxiliary power capacity greater than the onboard power capacity;
a camera interface configured to communicatively couple the auxiliary unit to the camera to recharge the onboard battery or to receive data from the camera; and
an external communication interface configured for coupling the auxiliary unit to an external power source or a computing device for transferring data received from the camera to the computing device.

A2. The camera system of paragraph A1, wherein the camera interface comprises a wired interface.

A3. The camera system of paragraph A2, wherein the wired interface comprises a male USB connector.

A4. The camera system of paragraphs A1-A3, wherein the auxiliary unit is implemented as a camera case having a configuration in which the camera case at least partially encloses the camera when the camera is connected to the camera interface.

A5. The camera system of paragraphs A1-A4, wherein the camera case further comprises a display.

A6. The camera system of paragraphs A1-A5, wherein the camera case further comprises one or more switches configured to activate one of a plurality of external communication components.

A7. The camera system of paragraph A6, wherein the one or more switches includes at least one actuator configured to at least partially expose or conceal a wired connector plug.

A8. The camera system of paragraphs A1-A7, wherein the camera interface comprises a wireless interface.

A9. The camera system of paragraph A8, wherein the wireless interface is configured to wirelessly charge the onboard battery.

A10. The camera system of paragraphs A1-A9, wherein the camera interface comprises a wired interface configured for receiving data from the camera and further comprises a wireless interface configured to wirelessly charge the onboard battery.

A11. The camera system of paragraphs A1-A10, wherein the external communication interface comprises a wired communication interface.

A12. The camera system of paragraphs A11, wherein the wired communication interface includes at least one male connector.

A13. The camera system of paragraphs A1-A12, wherein the camera interface includes one of a male USB connector or a female USB connector and wherein the external communication interface includes a male LIGHTNIG connector, a male USB connector, or both.

A14. The camera system of paragraphs A1-A13, wherein the external communication interface comprises a wireless communication interface.

A15. The camera system of paragraph A14, wherein the external communication interface comprises a Wi-Fi chip, a Bluetooth chip, or both.

A16. The camera system of paragraph A14, wherein the external communication interface comprises a dual band chip which includes both Wi-Fi and Bluetooth technologies.

A17. The camera system of paragraphs A1-A16, wherein the auxiliary unit includes a configuration in which the auxiliary unit at least partially encloses the camera when the camera is coupled thereto.

A18. The camera system of paragraphs A1-A17, wherein the auxiliary unit further comprises a user interface.

A19. The camera system of paragraphs A18, wherein user interface includes a display.

A20. The camera system of paragraphs A19, wherein said display is configured to be used as a viewfinder to adjust the positioning of the camera while capturing an image.

A21. The camera system of paragraph A18-A20, wherein user interface includes one or more functional indicators, one or more user controls, or a combination thereof.

A22. The camera system of paragraphs A1-A21, wherein the auxiliary unit further comprises volatile memory.

A23. The camera system of paragraphs A1-A21, wherein the auxiliary unit further comprises non-volatile memory.

A24. The camera system of paragraphs A1-A21, wherein the auxiliary unit further comprises volatile and non-volatile memory.

A25. The camera system of paragraphs A1-A24, wherein the auxiliary unit has an overall length of 120 mm or less and an overall width of 90 mm or less.

A26. The camera system of paragraphs A25, wherein the overall length is 70 mm or less and the overall width is 45 mm or less.

A27. The camera system of paragraphs A1-A27, wherein the external interface comprises a iOS communication module configured to enable direct wired communication between the auxiliary unit and a iOS mobile computing device.

A28. The camera system of paragraph A1, wherein the camera interface is wired and the external interface is wireless, the camera interface is wireless and external interface is wired, the camera interface and the external interface are both wired interfaces, or the camera interface and the external interface are both wireless.

A29. The camera system of paragraphs A1-A28, wherein the auxiliary unit is a mobile auxiliary unit.

A30. The camera system of paragraphs A1-A29, wherein the computing device is a mobile computing device.

A30. The camera system of paragraphs A1-A29, wherein the computing device is a cloud server.

A31. The camera system of paragraphs A1-A30, wherein the auxiliary unit comprises an indicator configured to provide an indication of status of the camera.

A32. The camera system of paragraphs A1-A31, wherein the indicator is configured to provide the indication of status of the camera only when the camera is docked to the auxiliary unit.

C1. An auxiliary unit attachable to and detachable from a wearable camera which includes a camera attachment member for removably attaching the camera to eyewear, the auxiliary unit comprising:
 a housing;
 a camera connector provided at an opening in the housing and comprising at least two electrical contacts;
 one or more electronic components at least partially enclosed within the housing, wherein the one or more electronic components are connected to the at least two electrical contacts; and
 an attachment member connected to or integral with the housing, wherein the attachment member is configured as an extension of the camera attachment member to enable the wearable camera and the auxiliary unit to be connected together to a common platform.

C2. The auxiliary unit of paragraph C1, wherein the auxiliary unit and camera are connectable together to an eyewear temple.

C3. The auxiliary unit of paragraph C1 or C2, wherein the attachment member is a rigid member.

C4. The auxiliary unit of paragraphs C1-C3, wherein the one or more electronic components comprises a camera communication interface, an external communication interface, a user interface, an auxiliary battery having auxiliary power capacity greater than onboard power capacity of the wearable camera, an auxiliary memory, or a combination thereof.

C5. The auxiliary unit of paragraphs C1-C4, wherein the one or more electronic components include a battery.

C6. The auxiliary unit of paragraph C5, wherein the battery is a rechargeable battery.

C7. The auxiliary unit of paragraphs C1-C6, wherein the one or more electronic components include wireless communication component.

C8. The auxiliary unit of paragraphs C1-C7, wherein the wireless communication component comprises a Wi-Fi chip, a Bluetooth chip, or a combination of the two.

C9. The auxiliary unit of paragraphs C1-C8, wherein the auxiliary unit further comprises a vibrator.

C10. The auxiliary unit of paragraphs C1-C9, wherein the auxiliary unit further comprises a voice communication module.

C11. The auxiliary unit of paragraph C10, wherein voice communication module comprises a microphone and a processor configured to perform voice recognition and control an operation of the auxiliary unit responsive to a voice command.

C12. The auxiliary unit of paragraph C10 or C11, wherein the voice communication module further comprises a speaker.

It will be understood that any of the auxiliary units described herein may be implemented as a case which is configured to at least partially enclose a wearable electronic device such as a wearable camera.

The above detailed description of examples is not intended to be exhaustive or to limit the method and system for wireless power transfer to the precise form disclosed above. While specific embodiments of, and examples for, the method and systems for wireless power transfer are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. It will be further appreciated that one or more components of base units, electronic devices, or systems in accordance with specific examples may be used in combination with any of the components of base units, electronic devices, or systems of any of the examples described herein.

What is claimed is:

1. A case for a wearable camera, the case comprising:
 onboard memory;
 a case body configured to communicatively connect the case to the wearable camera;
 a communication interface configured to communicatively connect the case to a computing device; and
 a case battery comprising a rechargeable power source configured to provide power to the wearable camera when the wearable camera is communicatively connected to the case;
 wherein the case body has a configuration in which the case body at least partially encloses the wearable camera;
 wherein the case, when the case battery is partially or fully charged by an external power source is capable of charging the wearable camera even though the case is removed from the external power source, thereby allowing the case to be portable while still charging the wearable camera; and
 wherein the wearable camera is releasably attachable to a plurality of different items, including eyewear.

2. The case of claim 1, wherein the case comprises greater memory capacity than a capacity of the onboard memory of the camera.

3. The case of claim 1, wherein the case comprises greater energy capacity than a capacity of the onboard power source of the camera.

4. The case of claim 1, wherein the storage capacity of the case memory does not exceed 1 gigabyte.

5. The case of claim 1, wherein the case battery has an energy capacity of 5 watt hours or less.

6. The case of claim 1 further comprising a power transmission coil for wirelessly charging the case battery.

7. The case of claim 6, wherein the case comprises firmware that is configured to activate the power transmission coil when the camera is received in the case.

8. The case of claim 7, wherein the case is configured to activate the power transmission coil when the camera is mechanically attached to the case.

9. The case of claim 1, wherein the case body has a configuration in which the case body fully encloses the camera.

10. The case of claim 1, wherein the case is configured to activate a wireless charging function when the camera is received in the case.

11. The case of claim 1, wherein the case body has an overall length of 120 mm or less and an overall width of 90 mm or less.

12. The case of claim 11, wherein the overall length is 70 mm or less and the overall width is 45 mm or less.

13. The case of claim 1, wherein the communication interface comprises at least one male connector.

14. The case of claim 13, wherein the case body includes an actuator configured to at least partially expose or conceal at least one of the male connectors associated with the communication interface.

15. The case of claim 14, wherein the actuator comprises a button or a lever configured to extend and retract a charging connector providing power or a Universal Serial Bus connector, to extend a charging connector providing power while retracting a Universal Serial Bus connector, or to extend a Universal Serial Bus connector while retracting a charging connector providing power.

16. The case of claim 1, wherein the case comprises internal electronics configured to communicatively couple the case to one or more devices with different operating systems.

17. The case of claim 16, wherein the communication interface comprises a male charging connector providing power, a male Universal Serial Bus connector, or both.

18. The case of claim 1, wherein the case further comprises a camera interface comprising a male Universal Serial Bus connector.

19. The case of claim 1, wherein the case further comprises:
a wired camera interface configured for data transfer; and
a wireless charging interface configured to wirelessly charge the onboard power when the camera is operatively arranged in relation to the wireless charging interface.

20. The case of claim 1, wherein the case further comprises a camera interface comprising a dual band transmitter/receiver, and wherein at least one of the bands of the dual band transmitter/receiver is configured to transmit power wirelessly to the camera when the camera is operatively arranged therewith.

21. The case of claim 1 further comprising a microcontroller chip that includes power management circuitry and data management circuitry.

22. The case of claim 21, wherein the microcontroller chip is further configured to process image data received from the camera to improve image quality of images captured by the camera.

23. The case of claim 21, wherein the microcontroller chip is further configured to reprogram an image sensor of the camera when the camera is communicatively coupled thereto.

24. The case of claim 21, wherein the case further comprises a camera interface that is configured for data reception at a first data transfer speed and at a second faster data transfer speed, and wherein the microcontroller chip is further configured to activate the second faster data transfer speed of the camera interface only when the case is wirelessly transmitting power to the camera.

25. The case of claim 1, wherein the case body comprises first body portion and a door which is movable relative to the first body portion to provide the case in the configuration in which the case body at least partially encloses the camera.

26. The case of claim 25, wherein the door is pivotally coupled to the first body portion.

27. The case of claim 26 further comprising a display.

28. The case of claim 27, wherein the case further comprises a camera interface, and wherein the first body portion includes the camera interface, the external communication interface, the case memory, the case battery, and the display.

29. The case of claim 25, wherein the case body further comprises a track configured to engage an attachment member of the camera.

30. The case of claim 25, wherein the case body further comprises a track configured to slidably receive an attachment member of the camera.

31. The case of claim 1, further comprising a user interface configured to provide visual, audible, or tactile feedback.

32. The case of claim 31, wherein the user interface is configured to illuminate a light, produce a sound, or activate a vibrator to provide a status indication or an alert.

33. The case of claim 1, further comprising a Global Positioning System module and configured to append location information to an image received from the camera.

34. The case of claim 1, wherein the microcontroller is further configured to append date information, time information, or both to an image received from the camera.

35. The case of claim 1, wherein the case comprises a display.

36. The case of claim 1, wherein the case is a smart case.

37. The case of claim 1, wherein data can be wirelessly transferred from the case.

38. The case of claim 1, wherein data can be transferred from the case.

39. The case of claim 1, wherein data can be transferred to the case.

40. The case of claim 1, wherein power can be wirelessly transferred from the case.

41. The case of claim 1, wherein power can be transferred from the case.

42. The case of claim 1, wherein power can be transferred to the case.

43. The case of claim 1, wherein data can be wirelessly transferred from the camera to the case to a separate computer device.

44. The case of claim 1, wherein data can be transferred from the camera to the case, and from the case to a separate computer device.

45. The case of claim 1, wherein the camera is magnetically attachable to the case.

46. The case of claim 1, wherein the camera is mechanically attachable to the case.

* * * * *